US010223671B1

(12) United States Patent
Toomey et al.

(10) Patent No.: US 10,223,671 B1
(45) Date of Patent: Mar. 5, 2019

(54) SYSTEM, METHOD AND COMPUTER PROGRAM PRODUCTS FOR DIRECT APPLYING TO JOB APPLICATIONS

(75) Inventors: Paul Toomey, Palm Harbor, FL (US); William Bryan Megargel, Tarpon Springs, FL (US)

(73) Assignee: GEOGRAPHIC SOLUTIONS, INC., Palm Harbor, FL (US)

( * ) Notice: Subject to any disclaimer, the term of this patent is extended or adjusted under 35 U.S.C. 154(b) by 1727 days.

(21) Appl. No.: 11/479,818

(22) Filed: Jun. 30, 2006

(51) Int. Cl.
*G06Q 10/00* (2012.01)
*G06Q 10/10* (2012.01)
*G06F 17/30* (2006.01)
*G06F 19/00* (2018.01)
*G06F 16/00* (2019.01)

(52) U.S. Cl.
CPC ......... *G06Q 10/1053* (2013.01); *G06F 16/00* (2019.01); *G06F 17/30* (2013.01); *G06F 19/00* (2013.01)

(58) Field of Classification Search
CPC ...... G06Q 10/1053; G06F 17/30; G06F 19/00
USPC ..................................... 705/1, 1.1, 321; 11/1
See application file for complete search history.

(56) References Cited

U.S. PATENT DOCUMENTS 5,806,043 A 9/1998 Toader
5,978,768 A 11/1999 McGovern et al.
6,213,780 B1 4/2001 Ho et al.
6,370,510 B1 4/2002 McGovern et al.
6,381,592 B1 4/2002 Reuning
6,385,620 B1 5/2002 Kurzius et al.
6,594,662 B1 * 7/2003 Sieffert et al.
6,606,601 B1 8/2003 Willard
6,691,122 B1 2/2004 Witte et al.
6,701,313 B1 3/2004 Smith
6,728,695 B1 * 4/2004 Pathria et al.
7,505,919 B2 3/2009 Richardson
8,504,559 B1 8/2013 Elman et al.
9,390,422 B2 7/2016 Toomey
2001/0027439 A1 * 10/2001 Holtzman et al. .............. 705/39
2002/0038299 A1 3/2002 Zernik et al.
2002/0072946 A1 6/2002 Richardson
2002/0073160 A1 6/2002 Purcell
2002/0091689 A1 * 7/2002 Wiens et al. ...................... 707/6
2002/0143573 A1 10/2002 Bryce et al.
(Continued)

FOREIGN PATENT DOCUMENTS

WO 210956 2/2002

OTHER PUBLICATIONS

Nicholson, Scott. Indexing and Abstracting the World Wide Web: An Examination of Six Web Databases. Information Technology and Libraries 16(2), 73-81. Syracuse University, 1997. (Year: 1997).*
(Continued)

*Primary Examiner* — Patrick McAtee
*Assistant Examiner* — Shaun D Sensenig
(74) *Attorney, Agent, or Firm* — Raubvogel Law Office

(57) ABSTRACT

Systems, methods and computer program products include capturing a job seeker's résumé, capturing a cached set of job postings from career websites, providing a search tool for the job seeker to find at least one job posting from the cached set of job postings and, in response to a directive from the job seeker, using information from the job seeker's résumé to directly apply for the found job posting on the career website.

42 Claims, 18 Drawing Sheets

(56) References Cited

U.S. PATENT DOCUMENTS

| | | | | |
|---|---|---|---|---|
| 2003/0046311 | A1 | 3/2003 | Baidya et al. | |
| 2003/0093322 | A1* | 5/2003 | Sciuk | 705/26 |
| 2003/0204439 | A1 | 10/2003 | Cullen | |
| 2004/0107112 | A1 | 6/2004 | Cotter | |
| 2004/0162844 | A1* | 8/2004 | Thome et al. | 707/102 |
| 2004/0236598 | A1 | 11/2004 | Thomsen | |
| 2005/0053908 | A1* | 3/2005 | Satheesh et al. | 434/350 |
| 2005/0071766 | A1* | 3/2005 | Brill et al. | 715/738 |
| 2005/0160014 | A1* | 7/2005 | Moss et al. | 705/26 |
| 2005/0188051 | A1* | 8/2005 | Sneh | 709/213 |
| 2006/0041532 | A1 | 2/2006 | Nikolov | |
| 2006/0080134 | A1 | 4/2006 | Toomey | |
| 2006/0155636 | A1 | 7/2006 | Hermann et al. | |
| 2006/0206448 | A1 | 9/2006 | Hyder et al. | |
| 2007/0239777 | A1 | 10/2007 | Toomey | |

OTHER PUBLICATIONS

Forbes, J. Randy, "Frequently Asked Questions on Unemployment Benefits", Retrieved Jun. 1, 2016, pp. 1-2.

Glazier, Ray et al., "One-stop shopping and vocational rehabilitation", American Rehabilitation, Washington: Autumn 1999. vol. 25, Issue 2, p. 8.

Mariani, Matthew, "A new credential for career development faciltators", Occupational Outlook Quarterly 42.3 (Fall 1998): 37-40.

PRNewswire. "Employment Publishing Launches Employment911.com to Provide No-Cost, One-Stop Solution for Job Seekers, Employers and Recruiters", PR Newswire, Apr. 7, 2000.

* cited by examiner

180

Confidential Résumé of Ray Seeker ——— 182

Patent Attorney ——— 184

EXPERIENCE: ——— 186

February 2002-Present: Patent Attorney for Wilson, Wilson and Love. Responsibilities include defensive intellectual property litigation in the electronics industry.

August 1998-January 2002: Patent Attorney for Jones, Torks and Dolenz. Responsibilities include preparing and prosecuting patent applications for automotive electronic assemblies.

EDUCATION: ——— 188

JD, University of Nebraska, Lincoln, NE
BS in Electrical Engineering, Stevens Institute of Technology, Hoboken, NJ, GPA 3.8.

PERSONAL: ——— 190

Home Phone: 800-555-1212
Cell Phone: 800-555-1213
Address: 1313 MockingBird Lane, Tampa, FL
Email: grandpa@hotmail.com

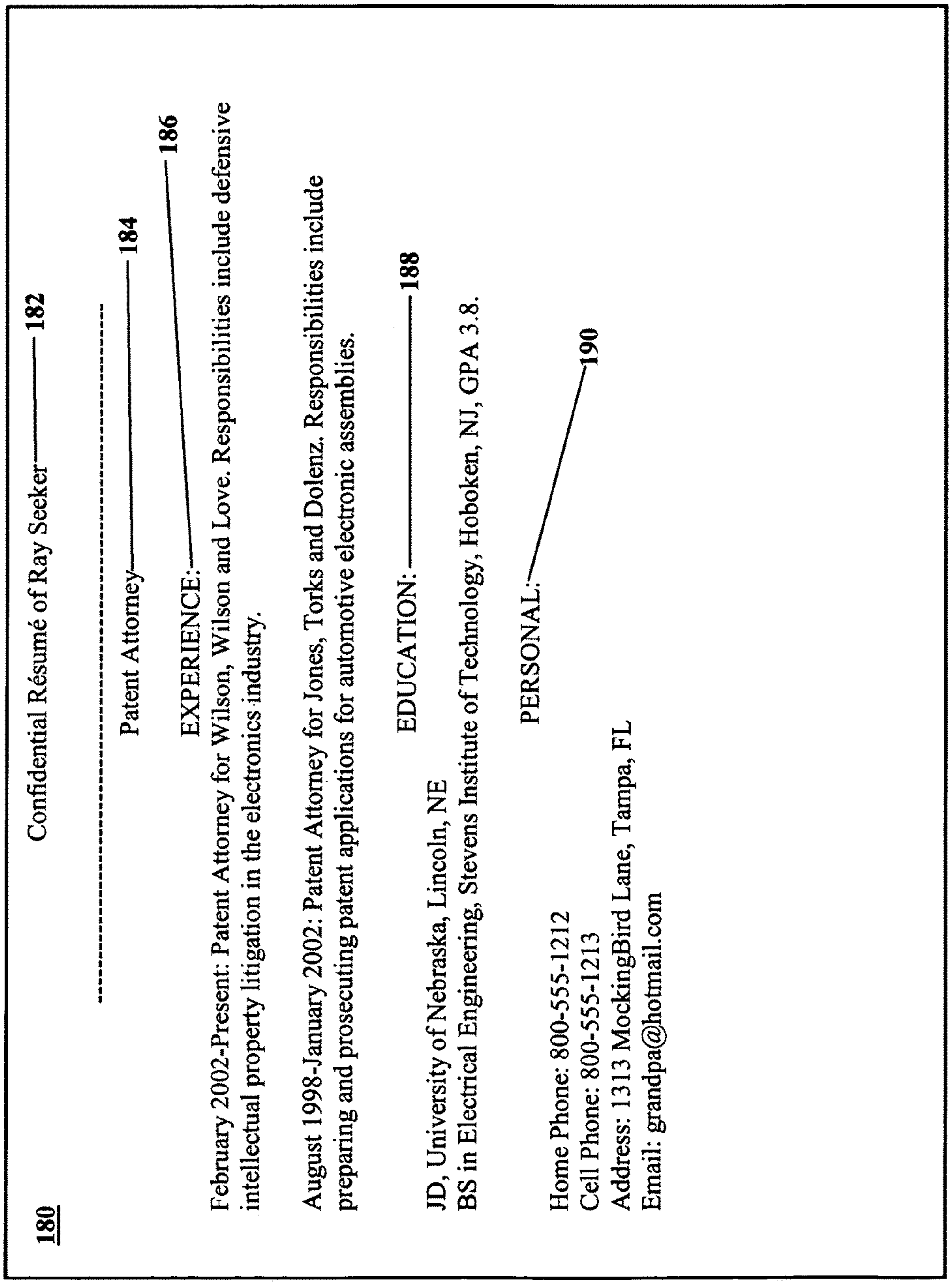

FIG. 8

|   |   |
|---|---|
| **Developer** | Resume Name: Patent Attorney    Modified: 5/22/06 — 301<br>Privacy Option: Available — 302<br>Visible Contact Info: Name, Email, Phone |

Personal Information: [Edit]

Name: Ray Seeker — 304
Phone: 800-555-1212            Email: grandpa@hotmail.com
Home Location: US-FL-Tampa-33604 — 306

Experience: [Edit]

Total Years exp: 4                    Most Recent Wage: — 308
Managed Others: No                  Languages Spoken:
Job Categories: Patent Law          Felony Conviction: No — 310
Security Clearance: No

Education: [Edit]

School: Univ of Nebraska    Major: Law    Degree: JD — 312
School: Steven's Inst.            Major: CS      Degree: BS — 314

Desired Position: [Edit]

Desired wage: — 316
Desired employment type:
Desired Commute:
Desired Travel:
Willing to relocate:
*<click the edit to add new locations>*

300

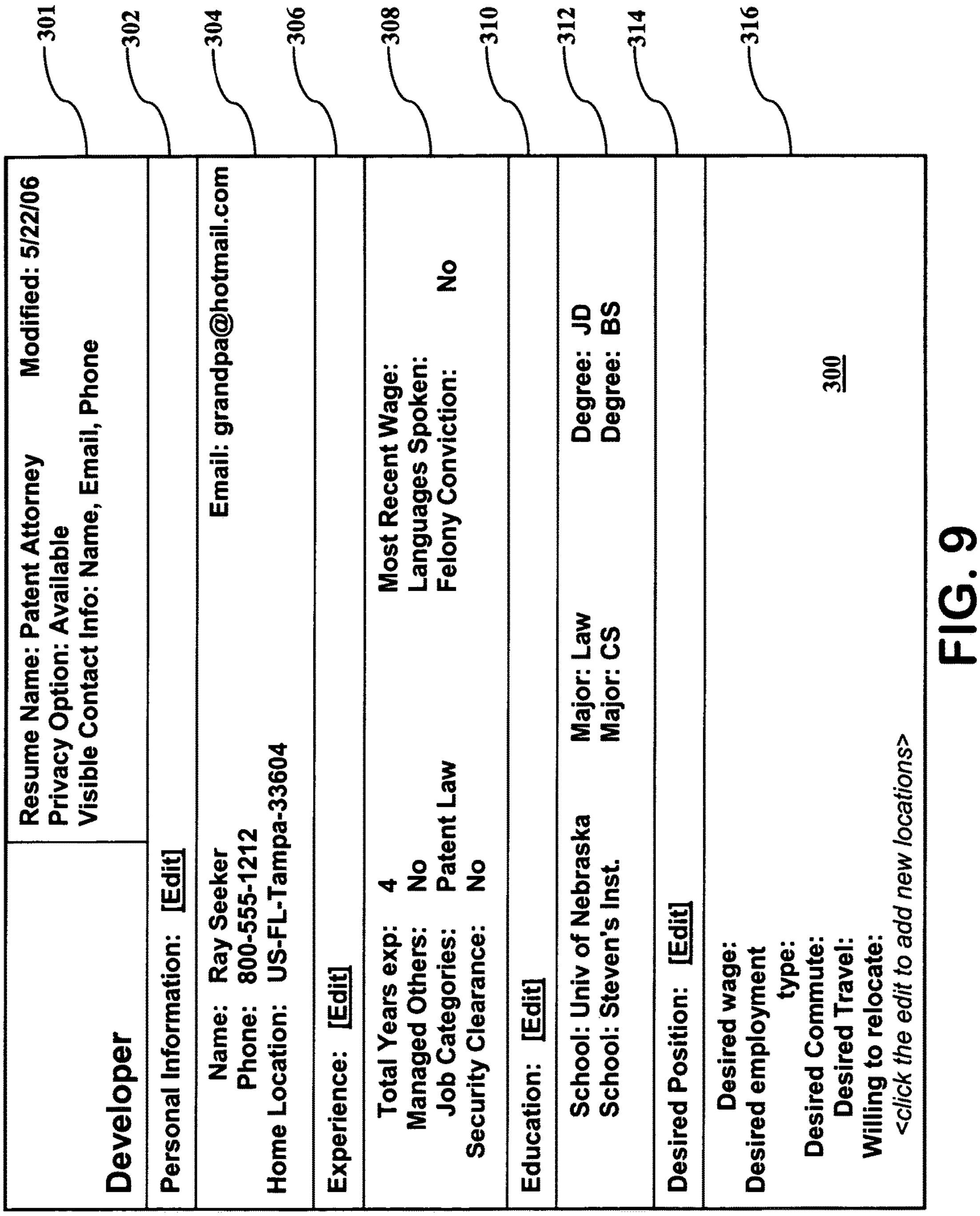

| Job Title | Employer | Location | Salary | Salary Unit | Source | Apply Now |
|---|---|---|---|---|---|---|
| Attorney | Fifth Third Bank | Saint Petersburg | | | PJB | |
| 03 - Engineer III - 7125 - V11U3(DSES) | Honeywell Inc | Fort Lauderdale | | | PJB | |
| 06-000040006000s | Suppressed | TARPON SPRINGS | $25,000.00-$48,000.00 | Year | ★ | APPLY |
| Patent Attorney | Citrix Systems Inc | Ft Lauderdale | | | CORP | |
| Sr. Patent Attorney | SAIC | Kennedy Space Center | | | PJB | |
| Tax Attorney | CyberCoders Engineering | Orlando | | | PJB | APPLY |
| Patent Attorney | Lockheed Martin | Lakeland, FL | | | PJB | |
| Patent Attorney | AMSEC LLC | Jacksonville | | | CORP | APPLY |
| Patent Attorney | Citrix Systems Inc | Ft Lauderdale | | | CORP | |

Src: ★[ Preferred Employer ], AJB [ America's JobBank ], CORP [ Corporate ], EDU [ Education Institution ], GOVT [ Government ], HOSP [ Hospitals ], NEWS [ Newspaper ], PJB [ Private Job Board ], RECT [ Recruiter ]

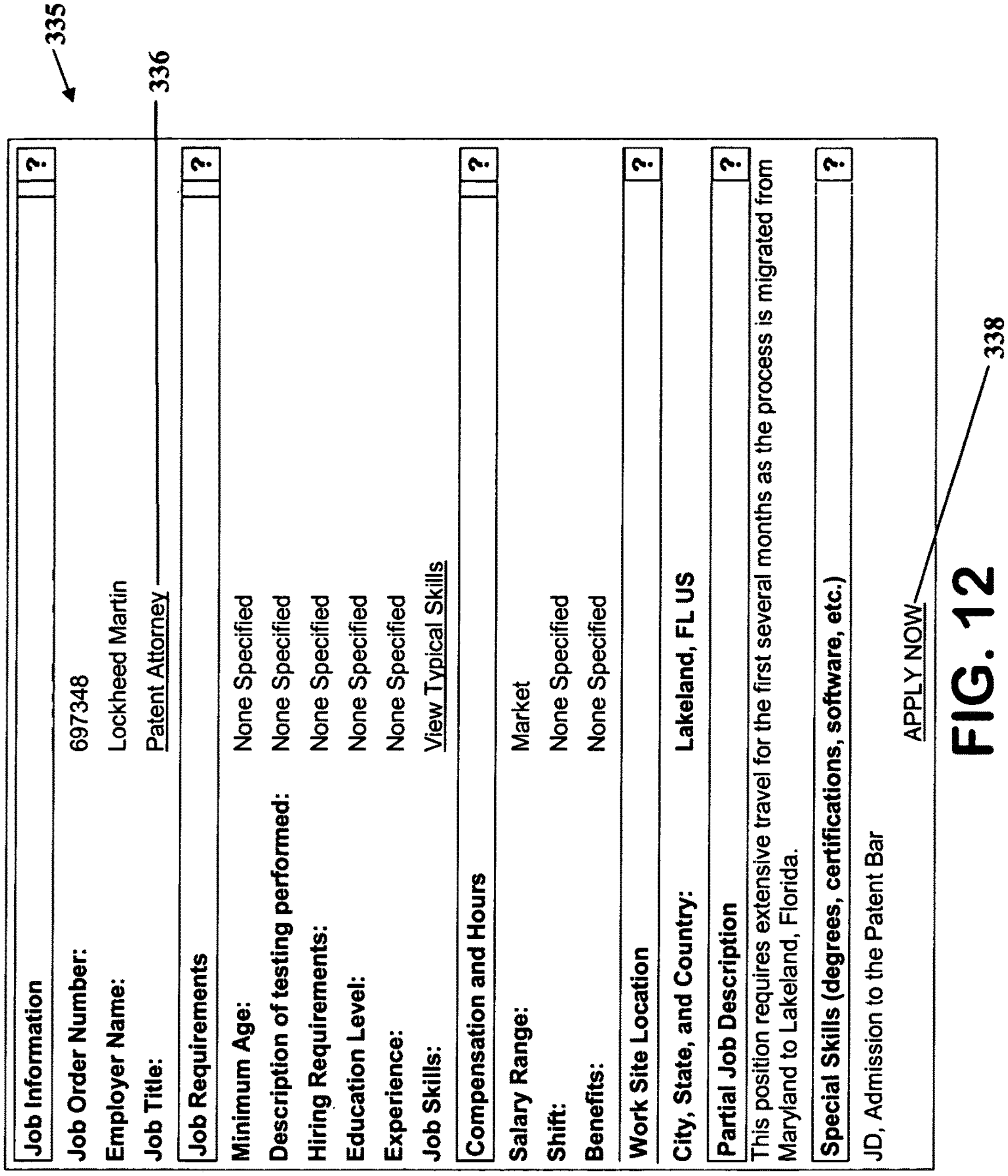

FIG. 12

| Job Information | | ? |
|---|---|---|
| Job Order Number: | 697348 | |
| Employer Name: | Lockheed Martin | |
| Job Title: | Patent Attorney | |

| Job Requirements | | ? |
|---|---|---|
| Minimum Age: | None Specified | |
| Description of testing performed: | None Specified | |
| Hiring Requirements: | None Specified | |
| Education Level: | None Specified | |
| Experience: | None Specified | |
| Job Skills: | View Typical Skills | |

| Compensation and Hours | | ? |
|---|---|---|
| Salary Range: | Market | |
| Shift: | None Specified | |
| Benefits: | None Specified | |

| Work Site Location | | ? |
|---|---|---|
| City, State, and Country: | Lakeland, FL US | |

| Partial Job Description | ? |
|---|---|
| This position requires extensive travel for the first several months as the process is migrated from Maryland to Lakeland, Florida. | |

| Special Skills (degrees, certifications, software, etc.) | ? |
|---|---|
| JD, Admission to the Patent Bar | |

APPLY NOW — 338

335, 336

Personal Information 420

- * Country: United States
- * First Name
- Middle Initial
- * Last Name
- Preferred Name
- * Address
- * City
- State
- * Zip
- * Home Phone
- Work Phone

422

* Resume (Please paste a copy of your resume in plain text in this field) — 424

* Have you been employed by My-company in the past? ○ Yes ○ No

* Where did you hear about us?

* Are you either a U.S. Citizen, a lawful permanent resident (green card holder), or have you been granted asylum or refugee status in the United States? ○ Yes ○ No

425

[Create My Resume] 426

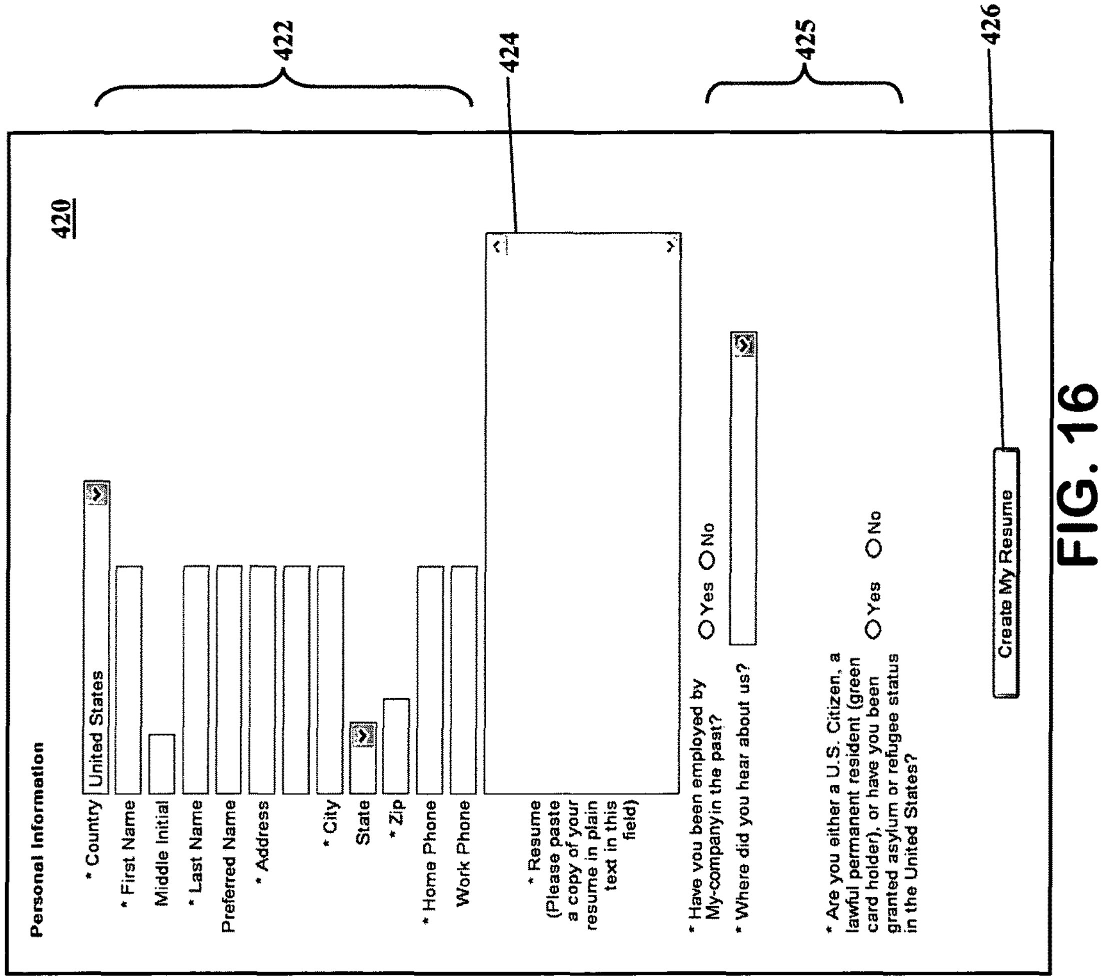

FIG. 16

Personal Information — 440

442:
- *Country: United States
- *First Name: Ray
- Middle Initial:
- *Last Name: Seeker
- Preferred Name: Ray Seeker
- *Address: 1313 Mockingbird Lane
- *City: Tampa
- State: FL
- *Zip: 33777
- *Home Phone: 800-555-1212
- Work Phone:

*Resume (Please paste a copy of your resume in plain text in this field) — 444:
February 2002-Present: Patent Attorney for Wilson, Wilson and Love. Responsibilities include defensive intellectual property litigation in the electronics industry.

August 1998-January 2002: Patent Attorney for

*Have you been employed by My-company in the past? ○ Yes ● No — 445

*Where did you hear about us?

*Are you either a U.S. Citizen, a lawful permanent resident (green card holder), or have you been granted asylum or refugee status in the United States? ● Yes ○ No — 447

[Create My Resume] — 446

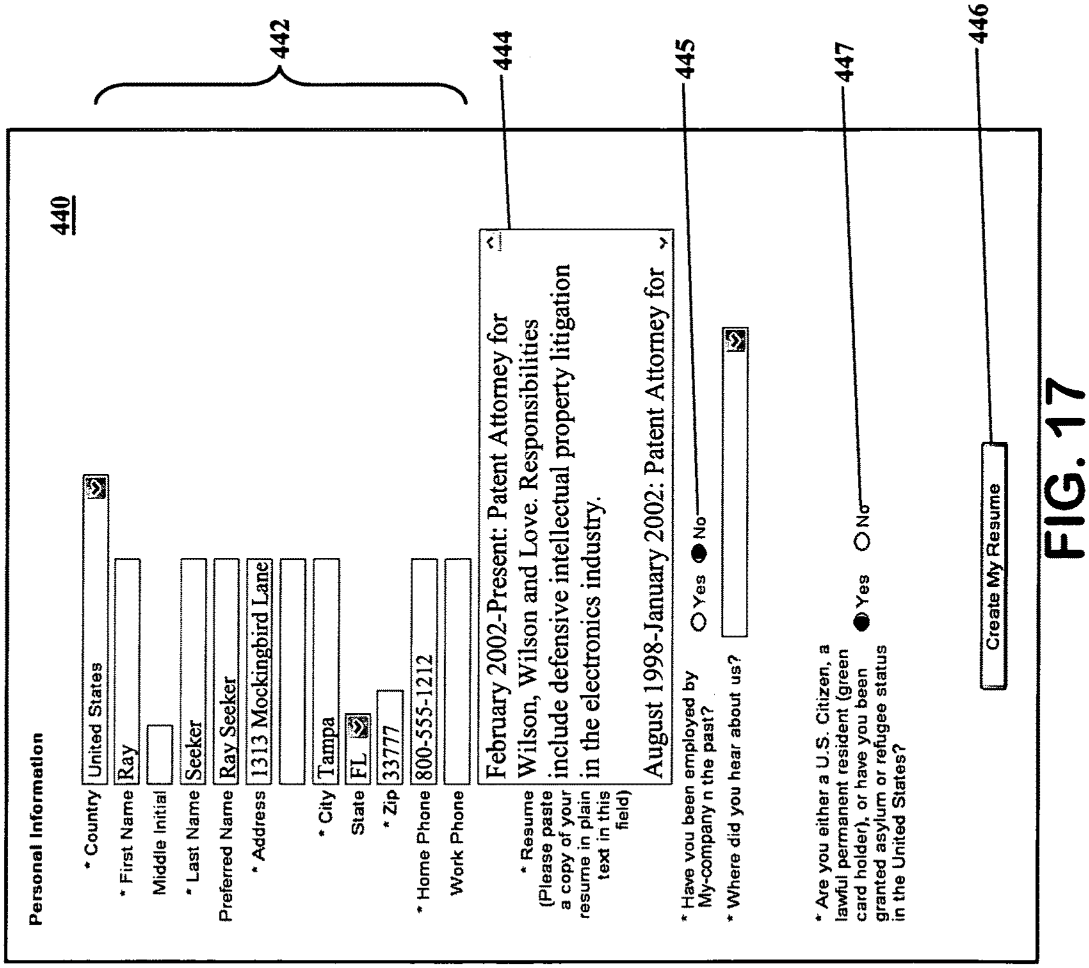

FIG. 17

SYSTEM, METHOD AND COMPUTER PROGRAM PRODUCTS FOR DIRECT APPLYING TO JOB APPLICATIONS

BACKGROUND OF THE INVENTION

1. Field of the Invention

This invention relates to the field of online job application and more particularly to a system, method and apparatus for applying to open positions on career websites.

2. Description of the Related Art

Finding a job has progressed from word-of-mouth to newspaper want-ads to modern online services. The likes of Hotjobs.com and CareerBuilder.com have web sites containing millions of job posts. Furthermore, profession-specific sites such as careers.findlaw.com, jtpos.com have many more job postings specific to a particular industry or profession such as law. Even more geographically restricted sites such as orlandosentinel.com, Miami.com and latimes.com have job postings restricted to a certain geographic area (Orlando or Miami, Fla. and Los Angeles, Calif.). Add to that a plethora of corporate web sites such as att.com/hr (AT&T), dell.jobs.com (Dell) and 3 m.com/careers (3M).

Each web site has its own database of job postings, its own search engine to help the jobseeker find the job they are looking for, its own format for displaying results and its own method/format for importing a résumé from the jobseeker. Furthermore, many of these web sites require the jobseeker have an account along with a username and password. In general, tens-of-thousands of new jobs are added, expired or modified every week; requiring the jobseeker to periodically log onto all potential career site (remembering their logon credentials) and searching for their desired job using the tools specific to that web site.

Adding to the difficulty in finding a job is the variability of job application processes at each of the different career sites. Each site has its own set of pages the jobseeker must maneuver to find, then to apply for a job. Each career site requires the job seeker to register and have a username and password for authentication. Each career site has a different set of data required for applying. Some career sites let the job seeker upload a résumé from a file and some require the job seeker to re-enter much of the information already contained in the job seekers résumé. All of which frustrates the job seeker.

Frustration and lost opportunities are caused by the job seeker having to remember user names and passwords from several different career sites; following the flow of different résumé capturing processes; and having to reenter details from their past experiences into data entry screens of the various career sites. Often, errors occur. The job seeker enters the date they started a job ten years ago as six years ago and the employer never calls—thinking there was a four-year gap in employment. Similarly, the job seeker enters 3 years of experience instead of 30 and an automatic screening program at the job website never delivers their résumé to a human relations person.

Often, a jobseeker is without work and anxious to be reemployed. They apply for many positions per day or per week, hoping to find a good job. Because of the huge number of job postings hosted on the World Wide Web, it takes many hours to visit each career site, search for relevant jobs, sift through the "hits," then, add to that, added time to fill out a job application, repeating the same information that is often on the job seeker's résumé. Case in point, a patent attorney looking for a job may look at web sites specific to law such as IPLAW and AIPLA. This is not sufficient; the patent attorney may desire a corporate position and needs to visit many different corporate web sites such as AT&T, Lucent, HP, etc. This is still not enough. The patent attorney needs to visit many different general career websites such as Hotjobs.com and CareerBuilder.com. Often, the different career sites have different username and password restrictions or their favorite user name has already been taken. Therefore, they have several different login credentials, needing to keep track of such for each career website, not to mention the time wasted logging into and out of the various career websites. To find a job quickly, the patent attorney visits all of the career sites every day to see if any new job postings were made the day prior. Then, finding a new job posting, the patent attorney must fill out the requisite application and track their application so they don't apply for the same position twice and so they can schedule follow-up letters or phone calls. It is conceivable that, for some positions like patent attorney, engineer and management, a jobseeker will have many active applications, perhaps over 200. Any improvement to the disparate collection of career sites will help the job seeker quickly find an open position, leading to a more efficiently employed population.

What is needed is a system that contains cached job postings from other career websites, captures a job seeker's résumé data, allows the job seeker to find a job posting of interest, and when instructed, the system uses data from the résumé to apply to the found job posting.

SUMMARY OF THE INVENTION

One objective of the present invention is to provide a computer automated way for a job seeker to search for an open position in a cached set of job postings and when one is found, providing a direct apply function.

Another objective of the present invention is to provide a system for creating and/or storing a job seeker's résumé, the system providing tools for finding an open position in a cache of job postings and for using information in the job seeker's résumé to directly apply for the found open position. The system of the present invention acts as a surrogate for the job seeker to apply for the open position on the career website from which the position emanated.

Another objective of the present invention is to provide a system for creating and/or storing a job seeker's résumé, the system providing tools for finding a set of open positions in a cache of job postings and for using information in the job seeker's résumé to directly apply for one or more of the open positions. The system acts as a surrogate for the job seeker to apply for the open positions on the career website from which the position emanated.

In one embodiment, a method for directly applying to a job posting from a career website is disclosed including storing a profile or resume within a storage area of a computer and identifying an open position, the open position having an associated apply-by-url address of an associated career website. Next, navigating to the associated career website by the computer and logging onto the career website. Once logged on, the system applies to the open position using information from the resume.

In another embodiment, a system for directly applying to a job posting from a career website is disclosed including a computer connected to a network with a storage device operationally adapted to the computer that has a job seeker profile and résumé stored within it. A job postings database is also stored within the storage device and is populated with a plurality of open positions from a plurality of career websites. A user interface is provided to search the job postings database for a matching open position. The user interface has a selector to initiate a direct apply function for the matching open position and in response to activation of the selector, a direct apply bot executes on the computer and to navigates to a career website associated with the matching open position through the network and logs onto the career website associated with the matching open position to directly apply to the matching open position.

In another embodiment, a computer readable medium including computer programming instructions that cause a computer to perform a method for directly applying to a job posting from a career website is disclosed, the method comprising the steps of storing résumé data or profile data and importing a plurality of job postings from a plurality of career websites and storing the plurality of job postings in a job postings database. Next, identifying an open position, the open position having an associate address of a source career website, navigating to the source career website, logging onto the source career website and applying to the one open position at the source career website.

In another embodiment, a computer program product for use with a computer system for directly applying to a job posting from a career website is disclosed including a computer usable medium having computer-readable code embodied in the medium, the computer-readable code having computer readable code for capturing a résumé and computer readable code for importing a plurality of open positions from a plurality of career websites and storing the plurality of job postings in a job postings database. There is also computer readable code for identifying one open position, the one open position having an associate address of a source career website and computer readable code for navigating to the source career website. Computer readable code is also provided for logging onto the source career website for applying to the one open position at the source career website.

BRIEF DESCRIPTION OF THE DRAWINGS

The invention can be best understood by those having ordinary skill in the art by reference to the following detailed description when considered in conjunction with the accompanying drawings in which:

FIG. 8 illustrates a typical résumé of all embodiments of the present invention.

FIG. 9 illustrates a sample user interface screen showing résumé information extracted from a typical jobseeker résumé of all embodiments of the present invention.

FIG. 11 illustrates a sample user interface screen for providing the jobseeker with a list of found open positions of all embodiments of the present invention.

FIG. 12 illustrates a sample user interface screen for providing the jobseeker detailed information regarding a selected open position of all embodiments of the present invention.

FIG. 16 illustrates a sample user interface screen for entering résumé information on a career website for applying to an open position of the prior art.

FIG. 17 illustrates the sample user interface screen of FIG. 16 after résumé information is added by all embodiments of the present invention.

DETAILED DESCRIPTION OF THE INVENTION

Figure 1:
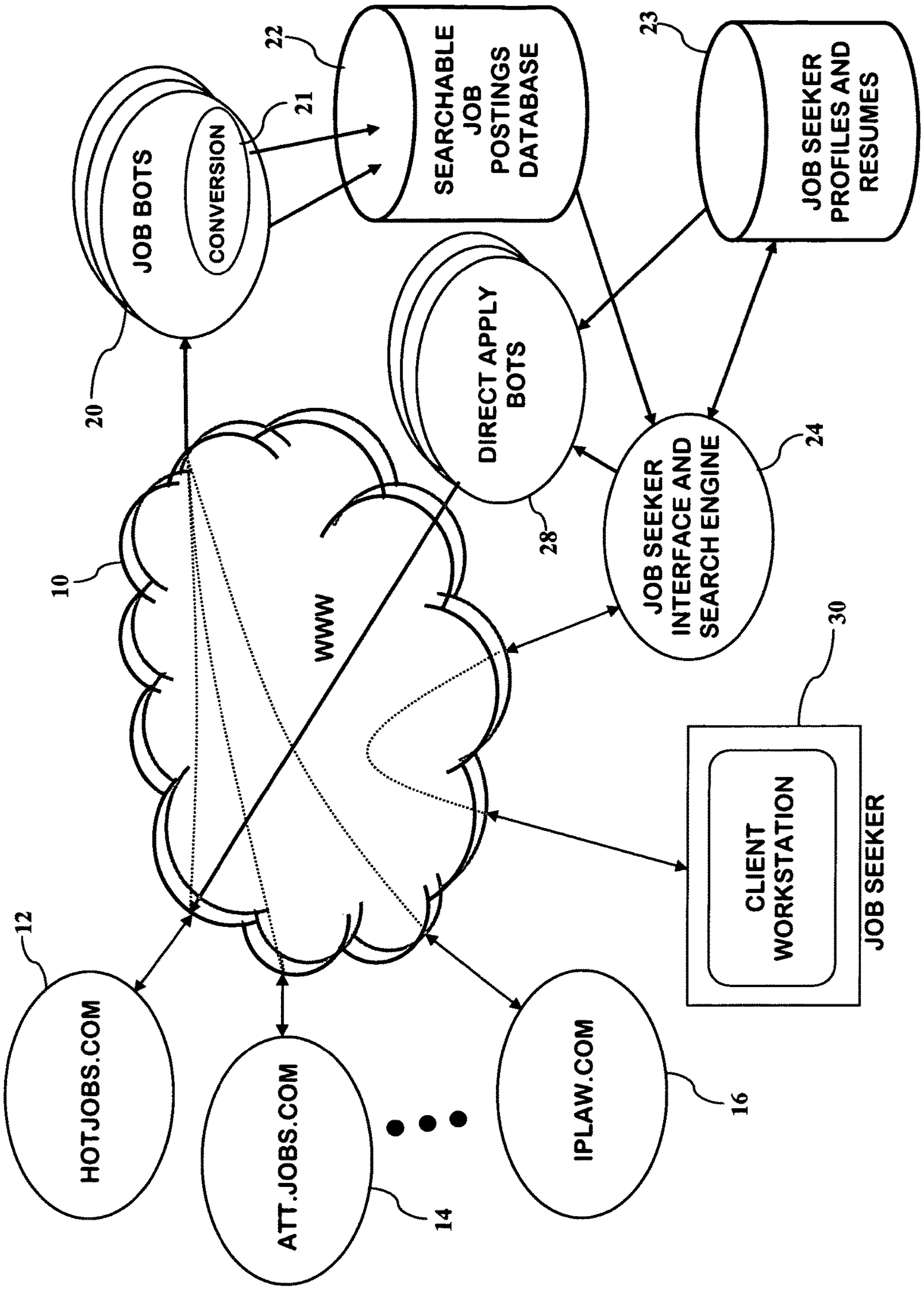
FIG. 1 illustrates an example system for consolidating job postings and directly applying to open positions on career sites according to one embodiment of the present invention.

Reference will now be made in detail to the presently preferred embodiments of the invention, examples of which are illustrated in the accompanying drawings. Throughout the following detailed description, the same reference numerals refer to the same elements in all figures. Throughout the description, the term job post or job posting refers to any type of electronic advertisement for an open position, e.g., a job. The term career site or job post hosting site refers to any electronic site accessible by the system of the present invention and having at least one job post stored therein. The term searchable job posting database refers to a searchable database for storing job post information or data extracted from one or more job hosting sites. The searchable job posting database has a schema defining the structure and relationship of its contents, but the exact schema can vary without veering from the inventive parts of the present invention. Furthermore, the searchable job posting database can be managed by any database manager including, for example, Oracle and Microsoft® Access, without veering from the inventive parts of the present invention. The term job spider refers to a program that automatically extracts data related to job postings from the job postings on career websites. The terms O*NET® or O*NET® code or ONET code refer to a numeric encoding of an occupational title. O*NET@ stands for the Occupational Information Network as supported by the United States Department of Labor. The term direct apply bot 28 refers to a software module that, preferably, operates unattended and, provided with a résumé and an open position having an associated career website address, navigates to the career website, logs onto the career website and directly applies to the open position on the career website, reporting any errors encountered. Throughout this description, the term "résumé" refers to a collection of job seeker employment related information maintained in a database. The data includes information normally found on a job seeker's résumé such as education and employment history. Additionally, the data includes auxiliary information that is not commonly found on a résumé such as salary requirements, username, password and a resume-ID to uniquely identify a particular résumé. In this, the term "résumé" and "profile" are used interchangeably and include any and all possible data related to the job seeker.

Referring now to FIG. 1, an exemplary system for consolidating job postings and directly applying to open positions on career sites is shown. The present invention includes job bots 20 that periodically visit job post hosting sites 12/14/16 to extract job post information. The job hosting sites 12/14/16 are, for example, public job sites (career sites) such as hotjobs.com 12; private corporate career sites such as AT&T Corporations att.jobs.com 14 and specialized for-fee career sites having a narrow set of types of jobs such as iplaw.com 16, having jobs related to the field of law. Other types of sites include the US and foreign governments and college web sites, etc. The present invention is not limited to the type of career website. A staff person searching the network for job postings creates a list of the target career websites.

For each particular hosting site 12/14/16, there is a corresponding job bot 20 designed to find job postings, parse information from the job postings and store the parsed information in the searchable job postings database 22. For much of the information found on the job postings, the data is copied directly into a record of the searchable job posting database 22. For example, the schema of the searchable job postings database 22 has a field for contact last name and the hosting site also has a field for contact last name, then that field is copied directly into the searchable record for that job posting. Alternately, if the job posting has a field for contact name (last, first) and the searchable job postings database 22 has a field for contact last name, then the field is passed through a conversion 21 that, in this example, copies all characters from the job post field for contact name up until the comma into the searchable job postings database 22 field for contact last name. The Searchable Job Post Fields in Table-1 below is an exemplary list of fields that are mined from the job posting into the searchable job postings database 22:

TABLE 1

Searchable Job Post Fields

| FIELD NAME | DESCRIPTION |
|---|---|
| Jobid | The job ID that is posted on the website. |
| JobWebsiteID | This is the job ID that the website. |
| jobtitle | The title of the job. |
| jobtype | Type of job. For example: full-time, part-time, and per-diem. |
| openings | Number of jobs of this type that are available. |
| postdate | The date the job was posted on the host site. |
| closedate | Last date to apply for the job. |
| startdate | When the job will be starting. |
| jobdesc | Description of the job. |
| education | Educational requirements of the job. |
| experience | The experience requirements of the job. |
| additionalinfo | Anything else that is relevant to the job that does not appear in another field. |
| shiftdesc | Information about the type of shift. |
| hours | Number of work hours per week. |
| benefits | Description of what benefits are included with the job and are specific for that job. |
| benefitsURL | A link to the benefits page, if one exists. |
| url | A link to the job details page. |
| applybyurl | A link to a page where the jobseeker can go to apply for the job. |
| salarystring | What the job pays, or a pay scale. |
| salary | The numerical amount of the pay. |
| maxsalary | The maximum salary that is available |
| salaryunit | Code used to describe pay frequency. |
| employer | The employer's name. |
| contact | The contact person or department. |
| phone | Phone number |
| fax | Fax number |
| email | Email address |
| address1 | The street address where the job is located. |
| city | The city where the job is located. |
| state | The state where the job is located. |
| country | The country where the job is located. |

Once searchable job posting records are available in the searchable job postings database 22, a job seeker at a client workstation 30 connects to the job seeker interface and search engine 24 of the present invention through a network, for example the World Wide Web 10. At this interface, the job seeker can search for job postings or open positions from many different career sites 12/14/16 by searching the cached job postings in the searchable job postings database 22. Once a job of interest is found (e.g., a record of the searchable job posting database 22 is identified), the job seeker can request to apply to that open position as will be described in detail later. The present invention also includes tools allowing the job seeker to register profile data (e.g., one or more résumés). Their résumé or profile data is stored in the job seeker profiles and résumés database 23 in individual fields for use later when the job seeker applies for a job. As will be shown, once the résumé or profile data is stored and processed, the job seeker can select a "direct apply" feature. In this, the job seeker interface and search engine 24 initiates one or more direct apply bots 28. When scheduled to run, each direct apply bot 28 accesses the job seeker's résumé from the job seeker profiles and résumés 23, logs onto the career websites (e.g., Hotjobs.com 12) and acts as a surrogate user on the selected career websites 12/14/16, creating an account for the jobseeker and applying for the selected position. An exemplary list of individual fields of the job seeker profiles and résumés database 23 is shown in Table 2.

TABLE 2

Job Seeker Profile Fields

| FIELD NAME | DESCRIPTION |
|---|---|
| Education | Schools attended |
| resumeID | Unique identity of each resume which is assigned by our server |
| Name | First name of person posting resume |
| Address | Street address of person posting resume |
| resumetitle | Title of resume to be posted |
| textFile | A compilation of the resume details in resume format |
| workStatus | If the person posting the resume is working or not |
| recentJobTitle | most recent job title |
| targetJobTitle | Job title that poster is looking for |
| AuthWorkInUS | If the person is authorized to work in US |
| emp_contact | Previous employer contact person |

TABLE 2-continued

Job Seeker Profile Fields

| FIELD NAME | DESCRIPTION |
|---|---|
| emp_startDate | Date started with previous employer |
| emp_jobtitle | Previous job title |
| emp_salary | Salary amount at previous employer |
| referenceName | Name of reference |
| Phone | Phone number of reference |
| referencetype | Type of reference given, IE: personal, professional, etc. |
| yearsknow | Years resume poster has known reference |
| SchoolStatus | If resume poster is in school at current |
| gpa_1 | School grade point average |
| major_1 | School major |
| compdate | Date of completion |

Figure 2:
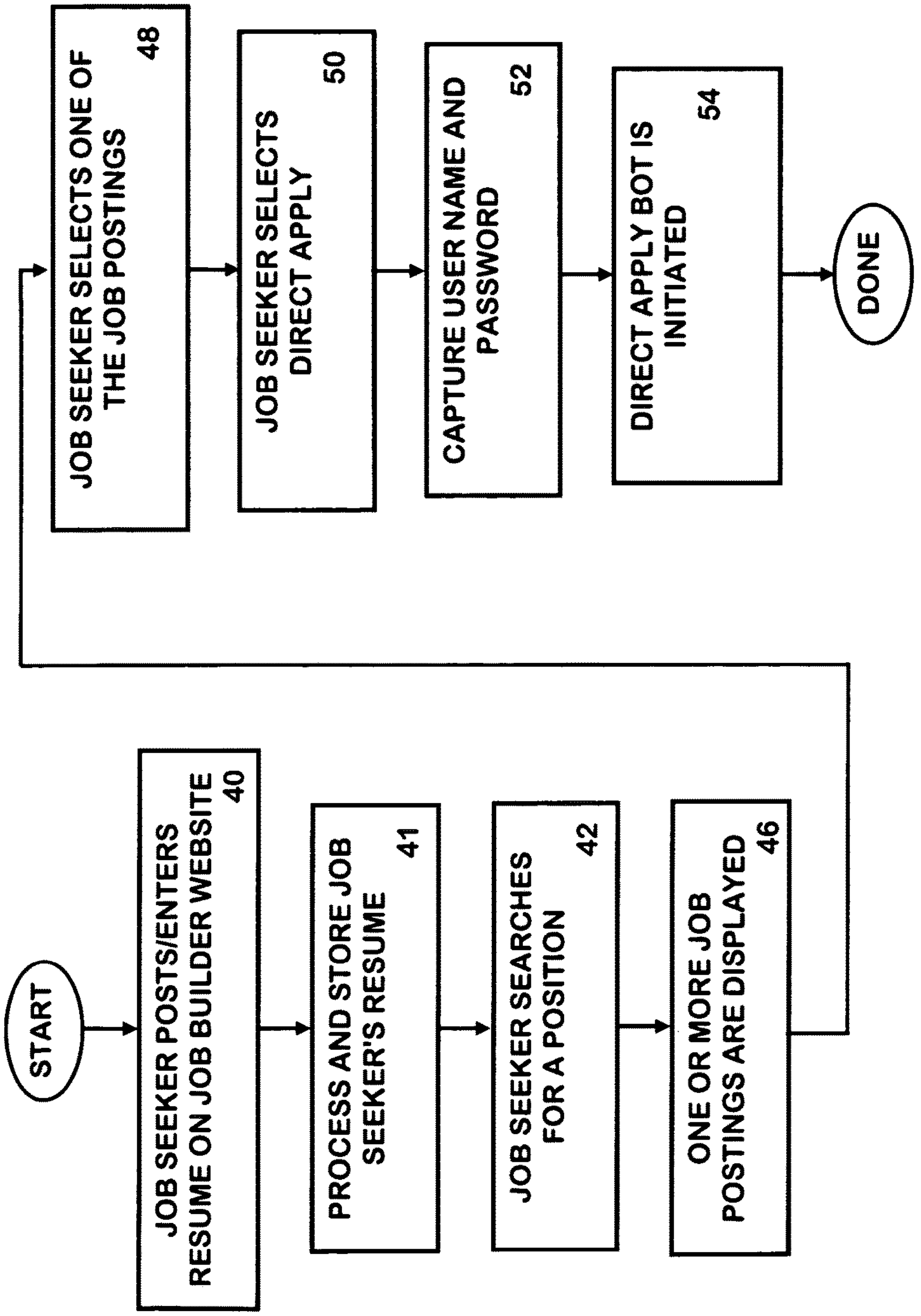
FIG. 2 illustrates a flow chart of the overall process for directly applying to open positions on career sites according to one embodiment of the present invention.

Referring now FIG. 2, a flow chart of the overall process for direct applying to open positions on career websites according to one embodiment of the present invention is shown. The process starts with the user or job seeker posting or entering one or more résumés 40 on the present system. The résumé or résumés are processed (see FIG. 4) and stored 41 in the job seeker profiles and résumés database 23. Next, the job seeker searches for an open position 42 and, if any are found, one or more open positions are displayed to the job seeker 46 (see FIG. 11). The jobseeker now selects one of the displayed open positions 48 (see FIG. 12) and, if interested in applying, selects the "direct apply" feature 50. At this point, if a default username and password is not already recorded, the jobseeker enters a desired username and password 52. In some embodiments, the username and password is generated by the present invention. Next, a direct apply bot 28 is initiated 54 to perform the direct apply function. There are many ways to determine what order and when to run direct apply bots 28. For example, a direct apply bot 28 is run when processor utilization is low or when network utilization is low. Another example is to determine how many other direct apply bots 28 are currently accessing the target career site and wait until that number is below a certain threshold. There are many methods of achieving similar results and the exact method can be varied without veering from the intent of the present invention.

Figure 2A:
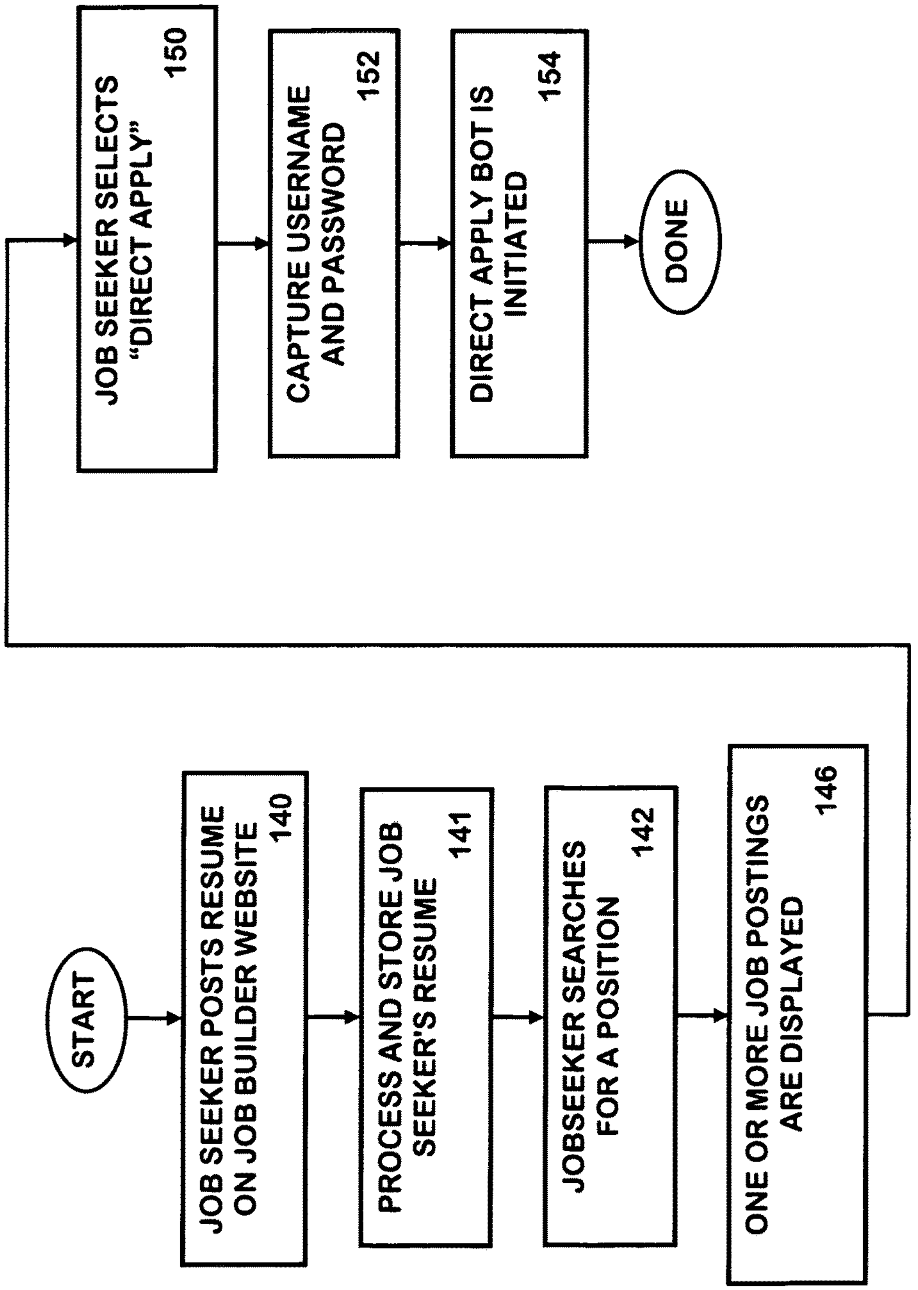
FIG. 2A illustrates a flow chart of the overall process for directly applying to open positions on career sites according to a second embodiment of the present invention.

Referring now FIG. 2A, a flow chart of the overall process for direct applying to open positions on career websites according to a second embodiment of the present invention is shown. The process starts with the user or job seeker posting one or more résumés 140 on the present system. The résumé or résumés are processed (see FIG. 4) aCnd stored 141 in the job seeker profiles and résumés database 23. Next, the job seeker searches for an open position 142 and, if any are found, one or more open positions are displayed to the job seeker 146 (see FIG. 11). If interested in applying to one of the displayed open positions, the job seeker selects the "direct apply" feature 150 associated with that open position. At this point, if a default username and password was not previously recorded, the jobseeker enters a desired username and password 152 and a direct apply bot 28 is initiated 154 to perform the direct apply function. There are many ways to determine what order and when to run direct apply bots 28. For example, a direct apply bot 28 is run when processor utilization is low or when network utilization is low. Another example is to determine how many other direct apply bots 28 are currently accessing the target career site and wait until that number is below a certain threshold. There are many methods of achieving similar results and the exact method can be varied without veering from the intent of the present invention.

Figure 3:
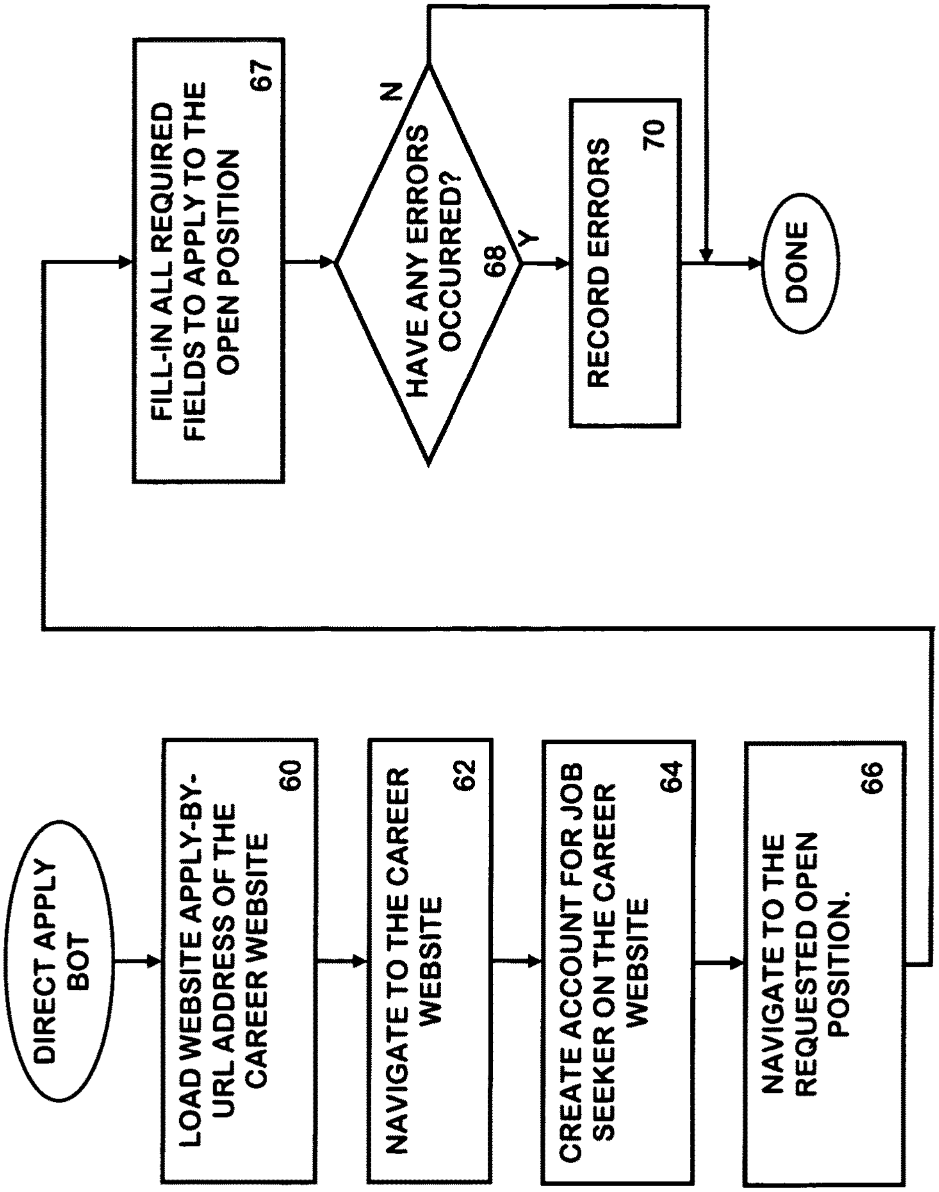
FIG. 3 illustrates a flow chart of the directly applying to open positions on career sites according to one embodiment of the present invention.

Referring now FIG. 3 illustrates a flow chart of the direct apply bot process for directly applying for open positions on career web sites according to one embodiment of the present invention is shown. The direct apply bot 28 loads the target website's (career site) "apply-by-url" address 60 and visits the career site 62. The "apply-by-url" was previously captured by the job bot 20 when the job bot 20 extracted the open position from the career site. Next, using a username, password and jobseeker-specific information, the direct apply bot 28 fills in all required fields to create an individual account 64. The jobseeker-specific information is extracted from the jobseeker's résumé and/or from data entered by the job seeker such as the username and password described above. As an example of this, if the jobseeker's résumé has a name of "Ray Seeker" and the career web site has a field titled, "Name:", then the direct apply bot 28 populates the "Name:" field with "Ray Seeker". Once the account is successfully created, the direct apply bot 28 accesses the requested open position 66 and uses information in the job seeker's résumé to apply for the open position at the career site 67. If any errors have occurred 68, the error is recorded 70 to signal the job seeker. Errors, for example, include the career site requiring a field to be completed while the direct apply bot 28 is not able to complete that field. For example, if the career site has a required field for "Date of Birth:" and that information is not available from the job seeker's résumé, the field is not populated and, if it is a required field, the account cannot be created and an error has occurred.

Figure 4:
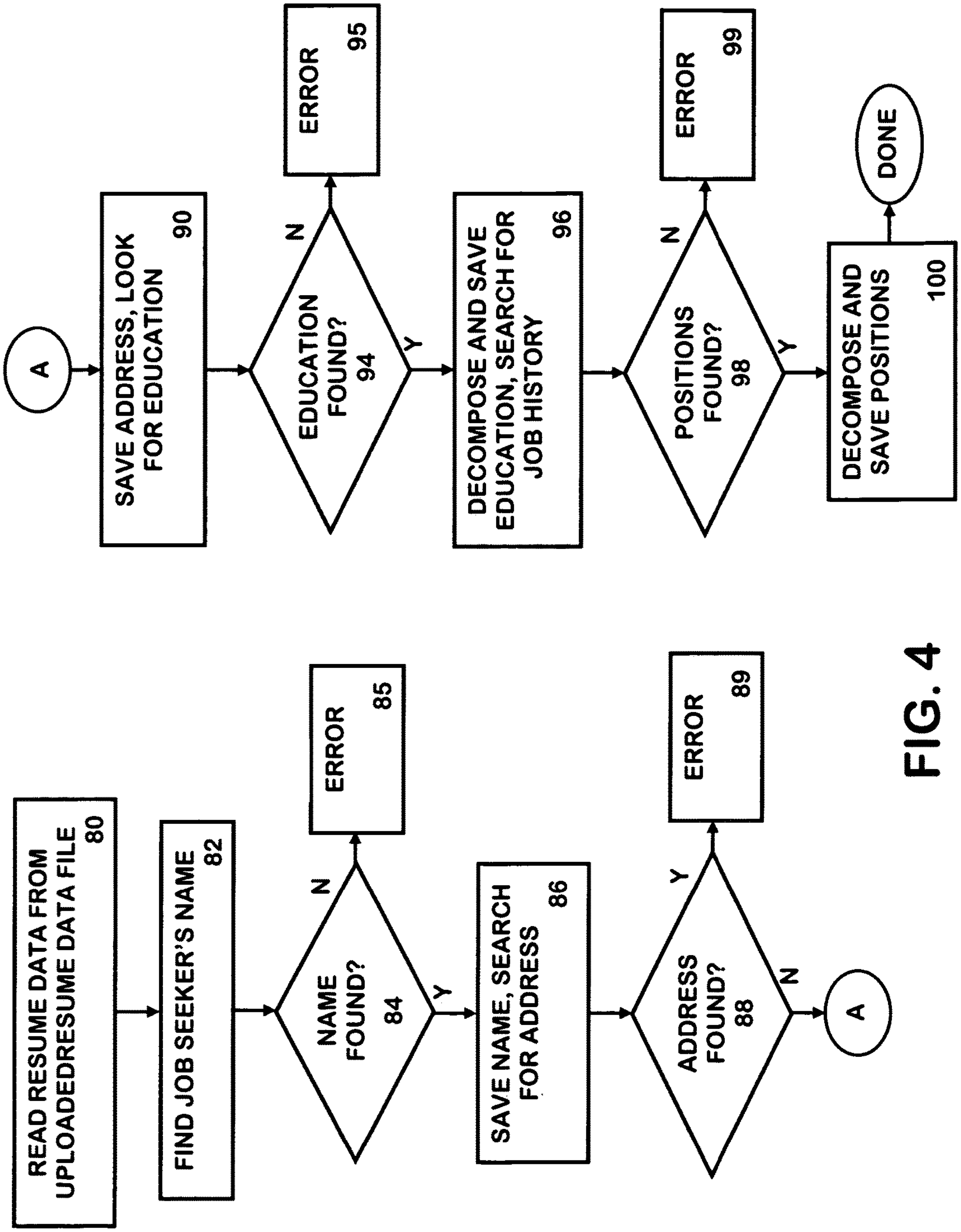
FIG. 4 illustrates a flow chart for extracting information from a job seeker's résumé according to one embodiment of the present invention.

Referring now FIG. 4 illustrates a flow chart for extracting information from a job seeker's résumé according to one embodiment of the present invention is shown. In the preferred embodiment, the job seeker creates an online résumé and/or profile using the job seeker user interface and search engine. In this, the job seeker enters data regarding employment history and desires in fields displayed on the user interface. In an alternate embodiment, much of this information is automatically extracted from an uploaded text résumé. A simplified example of extracting several discrete pieces of information from the job seeker's text résumé (name, address, education and positions) is shown in FIG. 4 as known in the art. Many other fields can be extracted without veering from or limiting the present application. For example, managerial experience, criminal background, security clearances, awards/recognition and date of birth are examples of other information that can be extracted. During the extraction, certain data is normalized or converted to a common format and representation so that it is easier to process later. Using age as an example, date of birth is the preferred format for storing this information. If the résumé contains the job seeker's age, assuming the job seeker was that age during the current year, the date of birth is deducted from the age and stored in a standard format (e.g., Jan. 1, 1960. Later, if filing out a career website page, the date of birth is required in a different format such as mm/dd/yy, the standard format is easily converted to the required format (e.g., 01/01/60). Similar conversions and analysis of the job seeker's résumé are performed to determine other key data from textual representations such as years of experience from a list of prior positions.

The process of extracting certain data from a text résumé starts with reading the résumé data from a data file that is either uploaded by the job seeker or created online 80. The first step is to find the job seeker's name 82. This can be done by various heuristic methods such as indexing words from the résumé in a first name dictionary to find a name [e.g., index("Patent") is false, index("Ray") is true.] Another method includes looking in well known places within the text or searching for prefix keywords ("résumé of" or "Name:"). If the name is not found 84, an error is reported 85. If the name is found, it is stored and a search is performed for the job seeker's address 86. This too can be done by various heuristic methods such as indexing words from the résumé in a city name dictionary to find a name [e.g., index("Patent") is false, index("Toledo") is true.] Another method includes looking in well known places within the text, searching for prefix keywords ("Street" or "Blvd.") or looking for a specific string of formatted text ("###<word> Street, <word> <state> #####"). If the address is not found 88, and error is reported 89. If the address is found 88, it is saved and the résumé is searched for educational background 90. This too can be done by various heuristic methods such as indexing words from the résumé in a degree name dictionary to find a degree name [e.g., index("Patent") is false, index("MS") is true, index("Masters") is true.] Another method includes looking in well known places within the text, searching for prefix keywords ("Education" or "Schools"), etc. If the education is not found 94, an error is reported 95. If the education is found, it is further decomposed into individual educational fields (e.g., one per degree) and a search for job history is performed 96. This too can be done by various heuristic methods such as indexing words from the résumé in a company name dictionary to find a company name [e.g., index("Patent") is false, index("AT&T") is true.] Another method includes looking in well known places within the text, searching for specific keywords (e.g., "managed," "supervised") or looking for specific lead patterns (e.g., "1998 to 2002" or "2002-present"). If the job history is not found 98, an error is reported 99. If job history is found 98, it is (optionally) further decomposed (e.g., to extract the total years of experience, etc.) and stored 100.

Figure 5:
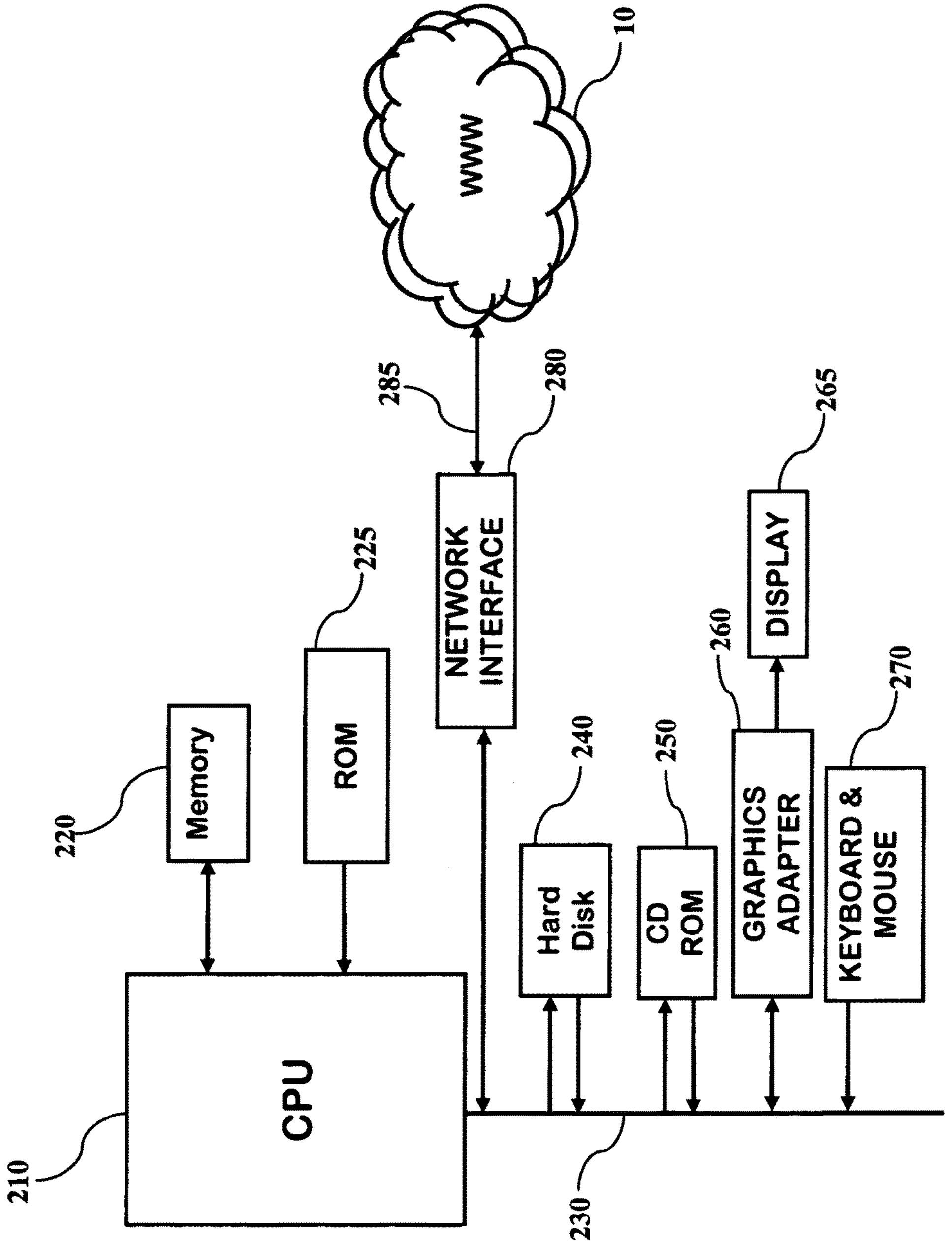
FIG. 5 illustrates an example computer system of all embodiments of the present invention.
Figure 6:
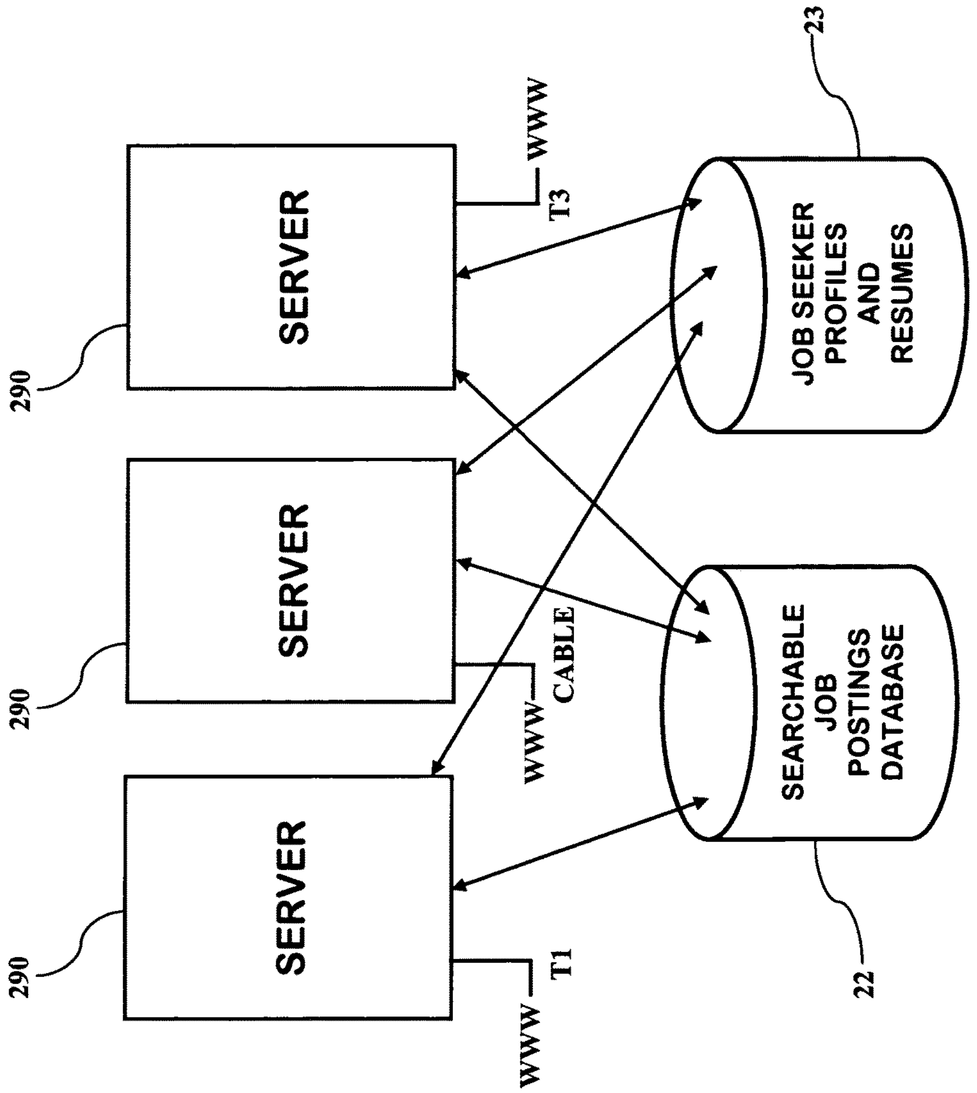
FIG. 6 illustrates a second example computer system of all embodiments of the present invention.

Referring to FIG. 5 and FIG. 6, a schematic block diagram of an exemplary computer system of the present invention is shown. Although shown in its simplest form, having a single processor, many different computer architectures are known that accomplish similar results in a similar fashion and the present invention is not limited in any way to any particular computer system. The present invention works well utilizing a single processor system as shown in FIG. 5, a multiple processor system where multiple processors share resources such as memory and storage, a multiple server system (as in FIG. 6) where several independent servers operate in parallel (perhaps having shared access to the searchable job posting database 22) or any combination. In this, a processor 210 is provided to execute stored programs that are generally stored for execution within a memory 220. The processor 210 can be any processor or a group of processors, for example an Intel Pentium-4® CPU or the like. The memory 220 is connected to the processor and can be any memory suitable for connection with the selected processor 210, such as SRAM, DRAM, SDRAM, RDRAM, DDR, DDR-2, etc. Firmware is stored in firmware storage 225 that is connected to the processor 210 and may include initialization software known as BIOS. This initialization software usually operates when power is applied to the system or when the system is reset. In some embodiments, the software is read and executed directly from the firmware storage 225. Alternately, the initialization software is copied into the memory 220 and executed from the memory 220 to improve performance.

Also connected to the processor 210 is a system bus 230 for connecting to peripheral subsystems such as a network interface 280, a hard disk 240, a CDROM 250, a graphics adapter 260 and a keyboard/mouse 270. The graphics adapter 260 receives commands and display information from the system bus 230 and generates a display image that is displayed on the display 265.

In general, the hard disk 240 may be used to store programs, executable code and data persistently, while the CDROM 250 may be used to load said programs, executable code and data from removable media onto the hard disk 240. These peripherals are meant to be examples of input/output devices, persistent storage and removable media storage. Other examples of persistent storage include core memory, FRAM, flash memory, etc. Other examples of removable media storage include CDRW, DVD, DVD writeable, compact flash, other removable flash media, floppy disk, ZIP®, laser disk, etc. In some embodiments, other devices are connected to the system through the system bus 230 or with other input-output connections. Examples of these devices include printers; mice; graphics tablets; joysticks; and communications adapters such as modems and Ethernet adapters.

The network interface 280 connects the computer-based system to the world-wide-web 10 through a link 285 which is, preferably, a high speed link such as a cable broadband connection, a Digital Subscriber Loop (DSL) broadband connection, a T1 line or a T3 line.

FIG. 6 shows a set of servers 290, each having access to the searchable job posting database 22 and the job seeker profiles and résumés database 23. In this example, direct apply bots 28 can be run in parallel on each server 290, accessing the job post hosting sites through, in this example, a serial T1 line operating at 1.44 Mbps providing access to the world-wide-web (www). Although T1, T3 and Cable connections are shown, any broadband connection works equally as well including dial-up, fiber, cable, DSL, T1 and T3. The searchable job postings and job seeker profiles/résumé databases are stored in storage devices accessible by each of the processors of the present system. Many storage devices as well as mechanisms of interfacing the storage devices to the processors of the present invention are known in the industry. For example, storage devices include stand alone disk drives, disk arrays, raid arrays, etc. Examples of interfaces include direct attachment (e.g., ATA, Serial ATA, ATAPI), Network Attached Storage (NAS), remote storage and the like.

Figure 7:
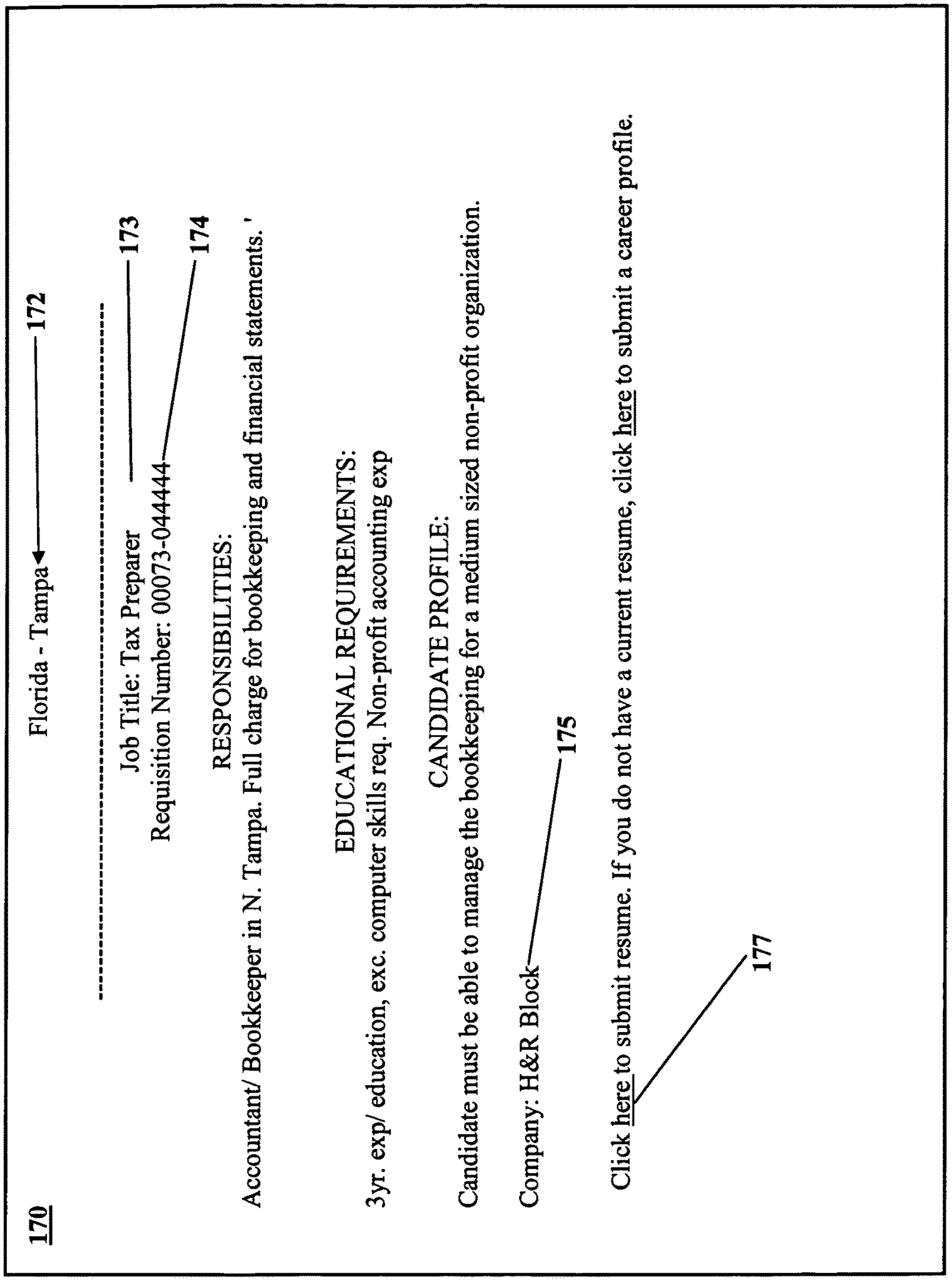
FIG. 7 illustrates an example of a job posting of all embodiments of the present invention.

Referring to FIG. 7, an example of a typical job posting 170 of all embodiments of the present invention is shown. In this example, key information in the job posts are found relating to the Searchable Job Post Fields in Table-1:

1. jobtitle follows "Job Title:"
2. jobdesc follows "RESPONSIBILITIES:" and ends just before "EDUCATIONAL REQUIREMENTS".
3. company follows "Company:" and ends just before "Click here"

In the example job posting 170, there is a location of the job (Tampa, Fla.) 172, the job title (tax preparer) 173, a job requisition number (00073-044444) 174 and company ("H&R Block") 175. Following that is a description of the job responsibilities, educational requirements and candidate profile. When this job posting is processed by the job bot 20, the link associated with "click here to apply" 177 is saved in the job post database in a field called applybyurl as in Table 1. By keeping this link, a job seeker finding this job posting by searching the job post database 22 using the job seeker interface and search engine 24 can apply directly to the position.

Referring now FIG. 8, a typical résumé 180 of all embodiments of the present invention is shown. In this typical résumé, created and formatted by a job seeker, the first line includes the name of the job seeker 182. Next, the job seeker has their field or specialty ("Patent Attorney") 184. Other examples of this are "Engineer," "Electrician," "Truck Driver," and "Clerk." In this example, the job seeker lists their experiences in reverse chronological order after a lead-in word "Experience:" 186. There are two previous jobs listed, one from August 1998-January 2002 and the other from February 2002-Present. Next, the job seeker lists their educational background after "EDUCATION:" 188. In this example, the job seeker has a JD and a BS degree. Personal information follows the lead-in "PERSONAL:" 190.

Referring now FIG. 9, a sample user interface screen 301 showing résumé information from the job seeker's profile as entered by the job seeker or extracted from a typical job-seeker text résumé of all embodiments of the present invention is shown. In the preferred embodiment, this exemplary set of information was entered by the job seeker on the previously described user interface. In an alternate embodiment, this exemplary set of information was extracted from the text résumé of FIG. 8. The top section 300 shows status information regarding this résumé or profile including a name given to the résumé, the date it was last modified, privacy options and a list of visible information. This is just an example of auxiliary information that is tracked for each résumé. Next, personal information from the résumé/profile is presented. In the personal information header 302, an "[Edit]" button is provided for the job seeker to click and change the information in the personal information section 304. In this example, the personal information 304 includes the job seeker name, phone, home location and email, though in other embodiments, more or less information is maintained.

Next, experience information is presented. In the experience information header 306, an "[Edit]" button is provided for the job seeker to click and change the information in the experience section 308. In this example, the experience information 308 includes total years of experience, managed others (Y/N), job categories, security clearance (Y/N), most recent wages, languages spoken and felony conviction (Y/N); though in other embodiments, more or less information is maintained. Next, educational information is presented. In the educational information header 310, an "[Edit]" button is provided for the job seeker to click and change the information in the educational information section 312. In this example, the educational information 312 includes schools attended, major and degree; though in other embodiments, more or less information is maintained. Next, desired position information is presented. In the desired position information header 314, an "[Edit]" button is provided for the job seeker to click and change the information in the desired position section 316. In this example, the desired position information 316 includes desired wages, desired employment type (e.g., "part time"), desired commute (e.g., 15 minutes) and relocation willingness (e.g., "Florida" or "Southeast"); though in other embodiments, more or less information is maintained. The information tracked is either extracted from the job seeker's résumé or entered through a user interface similar to that in FIG. 9.

Figure 10:
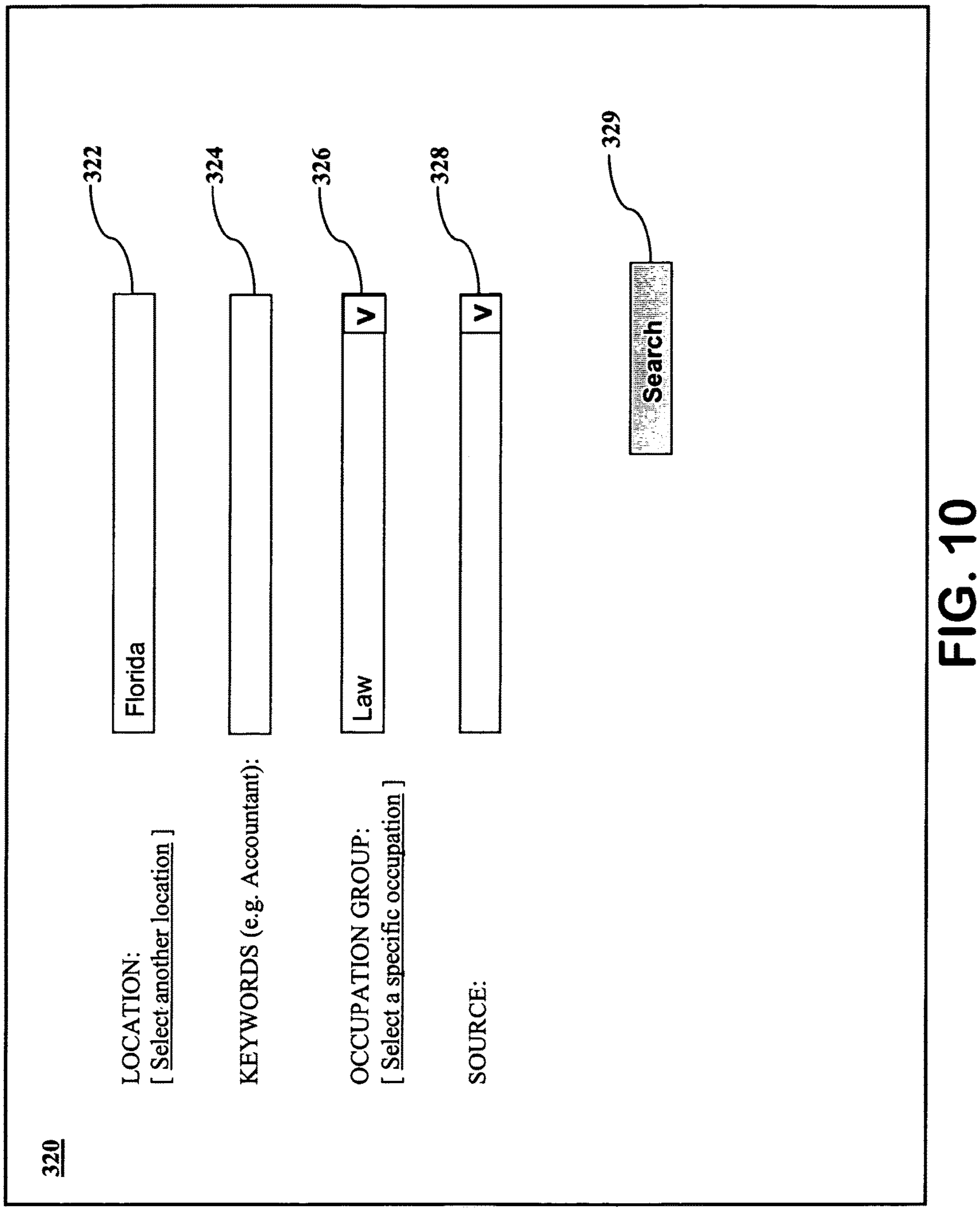
FIG. 10 illustrates a sample user interface screen providing a search for open positions feature of all embodiments of the present invention.

Referring now FIG. 10, a sample user interface screen providing a search for open positions feature of all embodiments of the present invention is shown. This user interface screen 320 provides an interface for the job seeker to search for open positions in the searchable job postings database 22. All user interfaces in this description are typical. Many other types and styles of user interfaces are well known in the art and can be used interchangeably with those presented. In the example user interface 320, the job seeker enters or selects criteria such as location 322 (e.g., Florida), keywords 324 (e.g., "software patents"), occupation group (e.g., "law" or "civil engineering") and source (e.g., "public job bank"). The source lets the job seeker narrow their search to specific categories of career websites such as governmental, educational and corporate.

Referring now to FIG. 11, a sample user interface screen for providing the jobseeker with a list of found open positions 330 of all embodiments of the present invention is shown. This typical display of open positions, is the result of a search performed similar to that of FIG. 10. Nine open positions were found, including one for a patent attorney at Lockheed Marten 336. The jobseeker has the ability to view that open position by selecting the underlined text 336 or the job seeker can directly apply to the position by selecting the "apply now" feature 334. The source of each open position is displayed in the "SRC" column 332.

Referring now to FIG. 12, a sample user interface screen for providing the jobseeker detailed information regarding a selected open position 335 of all embodiments of the present invention is shown. This user interface 335 is a sample of the information available regarding the open position, including the employer name, job requirements, compensation, location, skills required and a verbal description of the job or open position. The job title in this example is "Patent Attorney" 336. The jobseeker has the ability to directly apply to the position by selecting the "apply now" feature 338.

Figure 13:
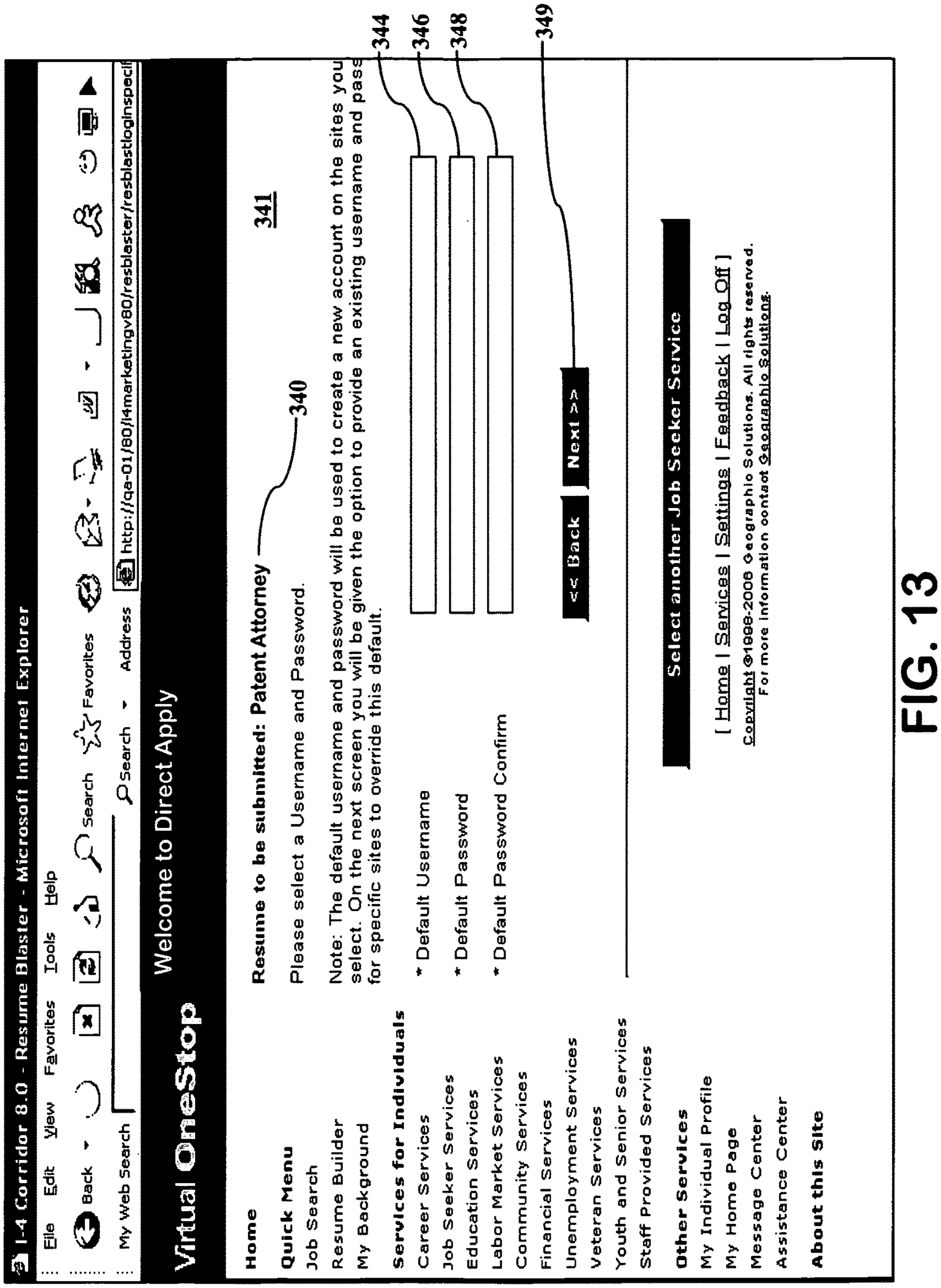
FIG. 13 illustrates a sample user interface screen for accepting a username and password from the job seeker of all embodiments of the present invention.

Referring now to FIG. 13, a sample user interface screen 341 for the jobseeker to provide a username and password for directly applying to an open position according to all embodiments of the present invention is shown. In this example, the job seeker has selected to use their patent attorney résumé 340 (see FIG. 9) to directly apply to the selected position. A user name 344 and password 346 and a confirmation password 348 are requested. Once the job seeker enters this information and selects "NEXT," 349 the direct apply bot 28 is initiated to access the career website and directly apply to the selected open position.

Figure 14:
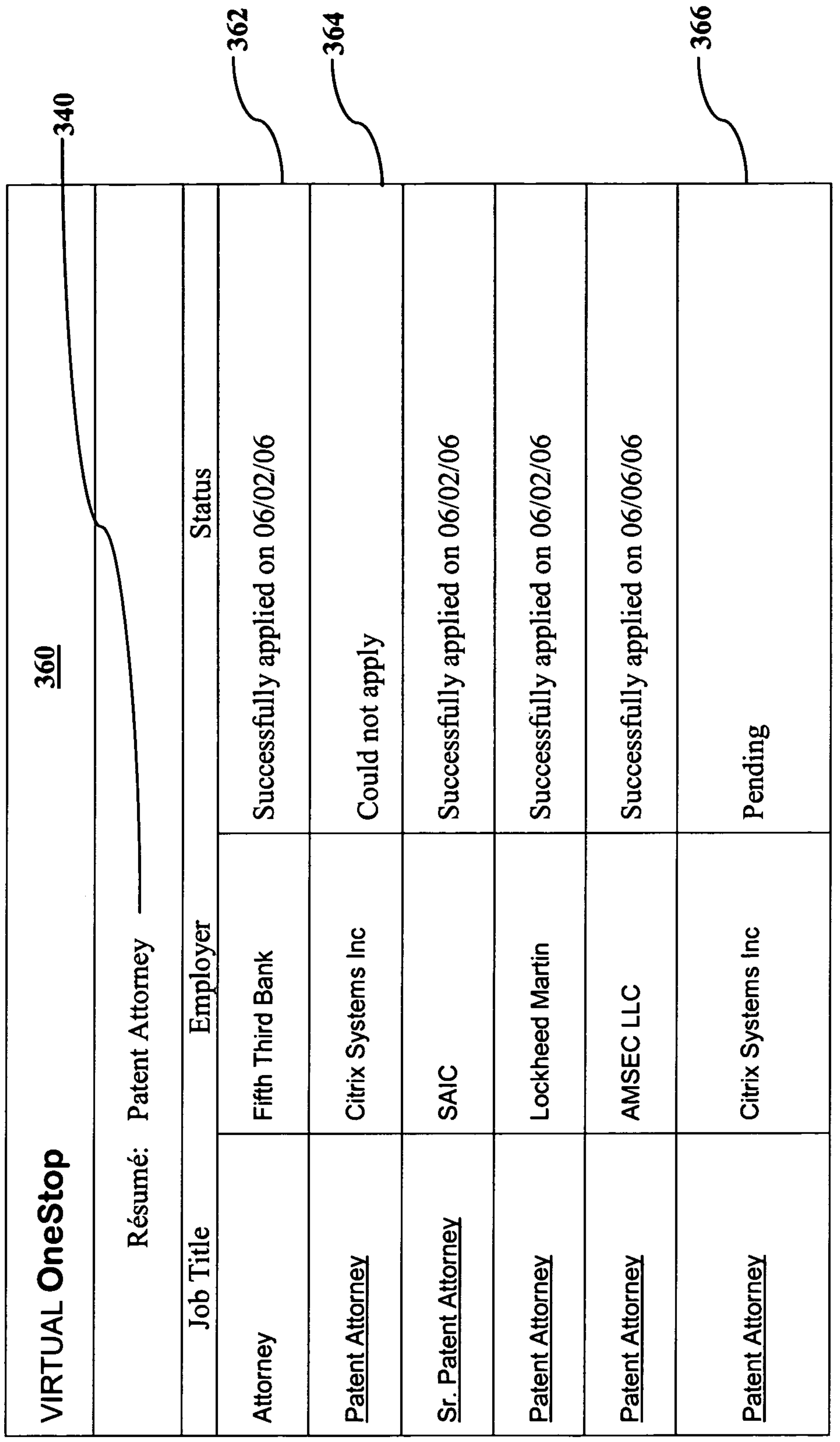
FIG. 14 illustrates a sample user interface screen for showing the jobseeker the status of previously applied for open positions of all embodiments of the present invention.

Referring to FIG. 14, a sample user interface screen 360 for showing the jobseeker the status of the direct apply feature of all embodiments of the present invention is shown. In this example, the job seeker has requested that his/her résumé referred to as "Patent Attorney" 340 be used to directly apply to several open positions. Varying levels of success were achieved. For example, this résumé has been successfully used to apply to an attorney position at Fifth Third Bank as shown with the first entry 362. Additionally, an error occurred when applying to a position with Citrix Systems, Inc. as shown with the second entry 364. There are many reasons for such a failure, including missing required information regarding the job seeker, inability to contact the career site (e.g., a time-out), etc. Lastly, an application to Citrix Systems, Inc. is still pending as shown with the last entry 366. This could be due to, for example, scheduling, unavailability of the career site or temporary unavailability of a network connection.

Figure 15:
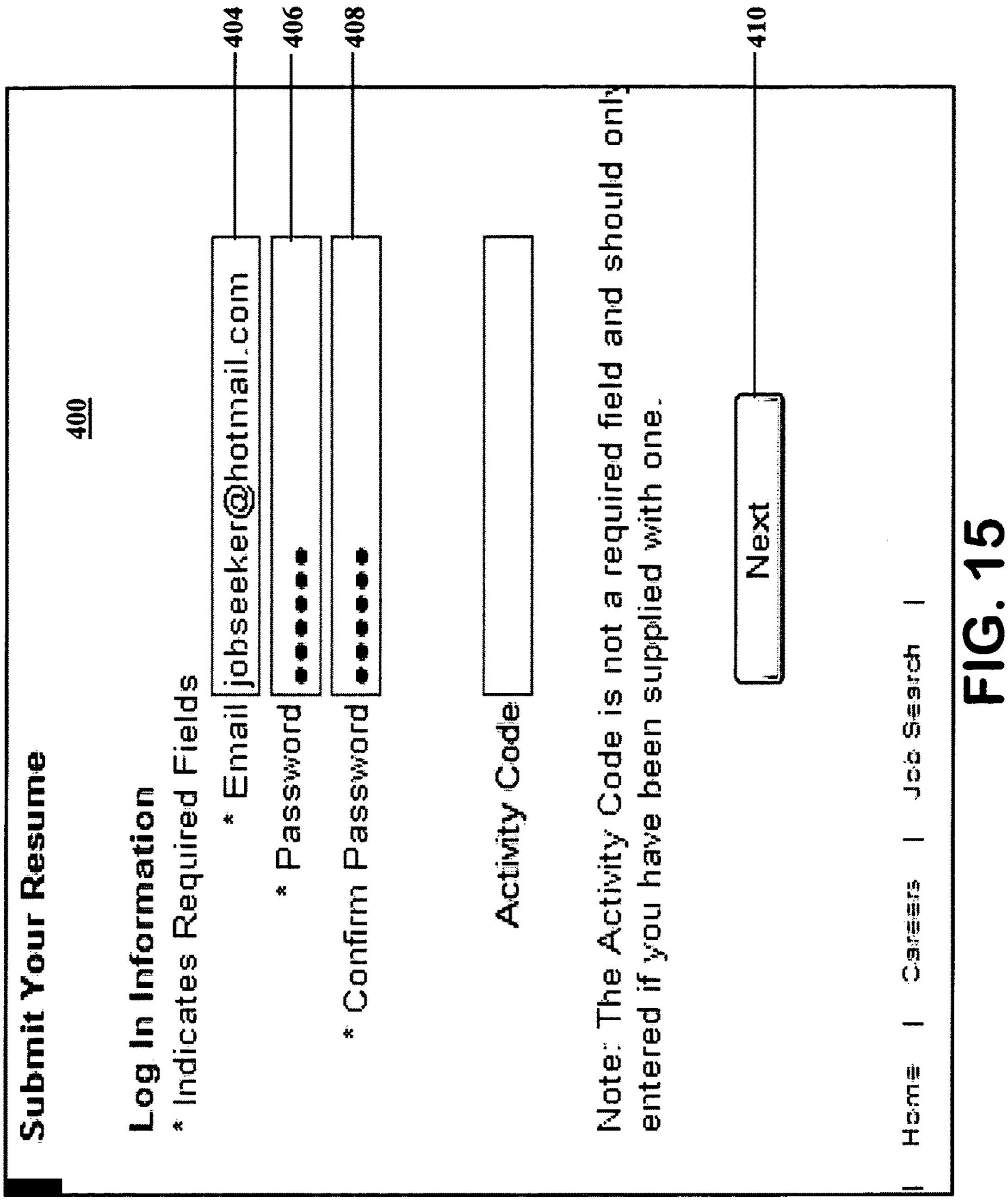
FIG. 15 illustrates a sample user interface screen for creating an account on a career website for applying to an open position of the prior art.

Referring to FIG. 15, a sample user interface screen 400 for creating an account on a career website for applying to an open position of the prior art is shown. In general, before applying to an open position on a typical career website, the job seeker (or in this case, the direct apply bot 28) needs to create a user account. To do this, a username 404 (in this example, the job seeker's email address) and a password 406 along with a password conformation 408 is entered by the direct apply bot 28, and then the "Next" button 410 is stimulated.

Referring to FIG. 16, a sample user interface screen 420 for entering résumé information on a career website for applying to an open position of the prior art is shown. This is a typical data entry screen that a job seeker will be presented with when applying for an open position on the typical career website. The job seeker (or in this case, the direct apply bot 28) needs to enter personal information 422 such as the jobseeker's name, address and phone number and a plain text résumé 424, then answer a few yes/no questions 425 and select the "I'm finished" button ("Create My Resume") 426. Each direct apply bot 28 is preprogrammed with knowledge of the specific data entry fields of each particular career website. For example, a position posted on a public job bank has one set of data required to apply for a position while a corporate career website has a different set of data required, perhaps in a different order and perhaps with a different representation for certain data. The direct apply bot 28 is customized for the specific career website, having knowledge of what data is required, in what positions, and in what format. The direct apply bot 28 performs conversions between the internally stored résumé data and the required format. For example, if the career website requires the jobseeker's name as "last, first" and the jobseeker's name is stored in the job seekers profiles and résumés database as two fields, first name and last name, then the direct apply bot 28 combines the two fields with a comma between them and inserts the jobseeker's name into the name field of the career website's application page. Similar conversions are performed for dates, addresses, phone numbers, date-of-birth, etc.

Referring to FIG. 17, the sample user interface screen 440 of FIG. 16 after résumé/profile information is added by all embodiments of the present invention is shown. As in FIG. 16, this is a typical data entry screen that a job seeker will be presented with when applying for an open position on the typical career website. The direct apply bot 28 has entered personal information 442 such as the jobseeker's first name ("Ray"), the job seeker's last name ("Seeker"), address and phone number and a plain text résumé 444 and then answers a few yes/no questions. When complete, the direct apply bot 28 stimulates an "I'm finished" button 446. Each direct apply bot 28 is preprogrammed with knowledge of the specific data entry fields of each particular career website. For example, a position posted on a public job bank has one set of data required to apply for a position while a corporate career website has a different set of data required, perhaps in a different order and perhaps with a different representation for certain data. The direct apply bot 28 is customized for the specific career website, having knowledge of what data is required, in what positions, and in what format. The direct apply bot 28 performs conversions between the internally stored résumé data and the required format. For example, if the career website requires the jobseeker's name as "last, first" and the jobseeker's name is stored in the job seekers profiles and résumés database as two fields, first name and last name, then the direct apply bot 28 combines the two fields with a comma between them and inserts the jobseeker's name into the name field of the career website's application page. Similar conversions are performed for dates, addresses, phone numbers, date-of-birth, etc. Also, yes-no fields are required by some career websites as shown 445/447. In some cases, the information is known from the jobseeker's résumé information while in some cases a default is taken. In this example, it is not known if the jobseeker has been employed by this company previously, so the direct apply bot 28 is programmed to select "no" to this question 445. Conversely, it is known that the jobseeker is a US Citizen, so the direct apply bot 28 selects "yes" to this question 447. If the jobseeker had not been a US Citizen, the direct apply bot 28 would select "no" to this question 447.

Equivalent elements can be substituted for the ones set forth above such that they perform in substantially the same manner in substantially the same way for achieving substantially the same result.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A method for directly applying to a job posting from a career website, the method comprising the steps of:

- gathering job seeker profile data from a job seeker and storing the job seeker profile data in a job seeker profile within a storage area of a computer;
- gathering a plurality of open positions from two or more career web sites and storing the plurality of the open positions in a searchable database in the storage area;
- gathering an apply-by-url address for each of the plurality of the open positions, storing the apply-by-url address in the searchable database in the storage area;
- the job seeker searching the searchable database through a user interface;
- responsive to the searching, the searchable database identifying at least one matching open position;
- the job seeker selecting one or more open positions from the matching open positions, each of the matching open positions having an address of the career website from where the matching open position came;
- applying to a selected matching open position through the apply-by-url address previously stored in the searchable database in the storage area;
- for each of the selected matching open positions:
  - the computer navigating to the address of the career website through a customized direct apply bot specific to the career website without further interaction by the job seeker, the navigation being scheduled based on preprogrammed criteria, the customized direct apply bot being preprogrammed as to data entry fields of the career website;
  - the computer logging onto the career website through the customized direct apply bot;
  - the computer applying to the selected matching open position through the customized direct apply bot using information from the job seeker profile; and
  - the computer generating a status report for each applied to selected matching open position, said status report showing successful application, unsuccessful application or pending application for each applied to selected matching open position.

2. The method according to claim 1, further comprising the job seeker entering a criteria in the searchable database through the user interface, said criteria comprising a desired employment type.

3. The method according to claim 2, wherein said criteria further comprising a desired wage.

4. The method according to claim 3, wherein said criteria further comprising a willingness to relocate.

5. The method according to claim 4, wherein said criteria further comprising a desired commute.

6. The method according to claim 1, wherein the step of logging onto the next career website uses a default username and a default password and the step of logging onto the next career website is preceded by the step of:

the computer creating a default user account on the career website using the default username and the default password.

7. The method according to claim 6, wherein the default username and default password are automatically generated.

8. The method according to claim 1, further comprising processing a resume of the job seeker to generate the job seeker profile; storing the job seeker profile in a job seeker profiles and resumes database, the job seeker profile further comprising a resume-ID wherein the resume-ID identifies a particular resume of the job seeker.

9. The method according to claim 8, wherein the storing of the job seeker profile includes entering employment-related data at a job seeker user interface and search engine.

10. The method according to claim 9, wherein the step of storing the job seeker profile further includes extracting the information from an uploaded text resume and the step of creating the default user account further includes using the information in creating the default user account.

11. A system for directly applying to a job posting from a career website, the system comprising:

a computer connected to a network;

a storage device operationally interfaced to the computer;

a job seeker profile and resume database stored within the storage device and containing at least one job seeker profile;

a job postings database stored within the storage device;

a plurality of job bots, the job bots extracting a plurality of open positions from a plurality of career websites and the job bots storing the open positions in the job postings database, each of the open positions having an associated career website address;

extracting an apply-by-url address for each of the plurality of the open positions, storing the apply-by-url address in the job posting database within the storage device;

a user interface searches the job postings database for a matching open position, the user interface having a selector to initiate a direct apply function for the matching open position, the direct apply function applying to the matching open position through the apply-by-url address previously stored in the job posting database within the storage device;

a customized direct apply bot specific to the career website of the applied to matching open position, the customized direct apply bot being preprogrammed with knowledge of the specific data entry fields for the career website of the applied to matching open position, wherein, in response to the selector, the customized direct apply bot executes on the computer and navigates to the associated career website address through the network without further interaction from a job seeker, the navigation being scheduled based on preprogrammed criteria, the customized direct apply bot logs onto the career website and the customized direct apply bot directly applies to the matching open position of the career website using information from the job seeker profile; and the computer generating a status report for each applied to matching open position, said status report showing successful application, unsuccessful application or pending application for each applied to matching open position.

12. The system of claim 11, wherein the network is a world-wide-web.

13. The system of claim 11, wherein the computer comprises multiple processors.

14. The system according to claim 11, further comprising the job seeker entering a criteria in the searchable database through the user interface, said criteria comprising a desired wage.

15. The system of claim 14, wherein said criteria further comprising a desired employment type.

16. The system of claim 15, wherein said criteria further comprising a willingness to relocate.

17. The system of claim 16, wherein said criteria further comprising a desired commute.

18. The system according to claim 11, wherein the direct apply bot uses a default username and a default password and creates a default user account on the career website; and the job seeker profile further comprising a resume-ID wherein the resume-ID identifies a particular resume of the job seeker.

19. The system according to claim 18, wherein the default username and default password are specified by a job seeker.

20. The system according to claim 18, wherein the default username and default password are automatically generated.

21. The system according to claim 11, wherein user interface uploads the at least one text resume from a client workstation.

22. The system according to claim 11, wherein the user interface accepts information from the job seeker and store the information in the at least one job seeker profile.

23. A computer system that performs a method for directly applying to a job posting that was extracted from a career website, the method comprising the steps of:

machine executable instructions running on the computer system causing the computer system to accept profile information from a job seeker and store the profile information in a job seeker profile in a job seeker profile and resume database;

machine executable instructions running on the computer system causing the computer system to import a plurality ofjob postings from a plurality of career websites and store the plurality of job postings in a job postings database;

machine executable instructions running on the computer system causing the computer system to import an apply-by-url address for each of the plurality ofjob postings, storing the apply-by-url address in the in a job postings database;

machine executable instructions running on the computer system causing the computer system to search the job postings database responsive to a query from the job seeker and identifying at least one open position, each of the at least one open position having an associate address of a source career website;

machine executable instructions running on the computer system causing the computer system to apply to the identified open position through the apply-by-url address previously stored in the job posting database;

for each identified open position:

machine executable instructions running on the computer system causing the computer system to navigate to the source career website associated with the identified open position through a customized direct apply bot specific to the source career website without further interaction by the job seeker, the navigation being scheduled based on preprogrammed criteria, the customized direct apply bot being preprogrammed as to data entry fields of the source career website;

machine executable instructions running on the computer system causing the computer system to log onto the source career website associated with the identified open position through the customized direct apply bot without further interaction by the job seeker;

machine executable instructions running on the computer system causing the computer system to apply to the identified open position at the source career website through the customized direct apply bot using the job seeker profile and without further interaction by the job seeker; and machine executable instructions running on the computer system generating a status report for each applied to identified open position, said status report showing successful application, unsuccessful application or pending application for each applied to identified open position.

24. The computer system according to claim 23, wherein the method further comprises machine executable instructions running on the computer system causing the computer system to accept from a job seeker a criteria, said criteria comprising a willingness to relocate.

25. The computer system according to claim 24, wherein said criteria further comprising a desired employment type.

26. The computer system according to claim 25, said criteria further comprising a desired wage.

27. The computer system according to claim 26, wherein said criteria further comprising a desired commute.

28. The computer system according to claim 23, wherein the step of the machine executable instructions running on the computer system causing the computer system to log onto the source career website uses a default username and a default password and the step of logging onto the source career website is preceded by the step of:

machine executable instructions running on the computer system causing the computer system to create a default user account on the source career website using the default username and the default password without further interaction by the job seeker; and machine executable instructions running on the computer system causing the computer system to create a resume-ID wherein the resume-ID identifies a particular resume of the job seeker.

29. The computer system according to claim 28, wherein the default username and default password are specified by a job seeker.

30. The computer system according to claim 28, wherein the machine executable instructions running on the computer system causing the computer system to store the profile information in a job seeker profile includes machine executable instructions running on the computer system causing the computer system to upload a text resume from a client workstation.

31. The computer system according to claim 30, wherein the machine executable instructions causing the computer system to store the job seeker profile further includes machine executable instructions running on the computer system causing the computer system to enter job seeker information at a job seeker user interface and search engine.

32. The computer system according to claim 23, wherein the method further comprises automatically generating the default username and the default password.

33. A computer system for directly applying to a job posting from a career website, the computer system comprising:

a server;

a plurality of machine executable instructions running on the server uploads a job seeker profile from a job seeker;

a plurality of machine executable instructions running on the server import a plurality of job postings from a plurality of career websites and store the plurality of job postings in a job postings database;

a plurality of machine executable instructions running on the server import an apply-by-url address for each of the plurality of job postings and store the apply-by-url address in the job posting database;

a plurality of machine executable instructions running on the server receive and search criteria from the job seeker, and the plurality of machine executable instructions running on the server finds at least one open position in the job postings database and each of the at least one open position has an associate address of a source career website;

a plurality of machine executable instructions running on the server apply to the found open position through the apply-by-url address previously stored in the job posting database;

a plurality of machine executable instructions running on the server navigate to the source career website for the applied to found open position through a customized direct apply bot specific to the source career website without further interaction by the job seeker, the navigation being scheduled based on preprogrammed criteria, the customized direct apply bot being preprogrammed as to data entry fields of the source career website; logs onto the source career website through the customized direct apply bot without further interaction by the job seeker; and apply to the found open position at the source career website through the customized direct apply bot using the job seeker profile without further interaction by the job seeker; and a plurality of machine executable instructions running on the server generating a status report for each applied to found open position, said status report showing successful application, unsuccessful application or pending application for each applied to found open position.

34. The computer system according to claim 33, further comprising a plurality of machine executable instructions running on the server accepting from a job seeker a criteria, said criteria comprising a desired employment type.

35. The computer system according to claim 34, wherein said criteria further comprising a desired wage.

36. The computer system according to claim 35, wherein said criteria further comprising a willingness to relocate.

37. The computer system according to claim 36, wherein said criteria further comprising a desired commute.

38. The computer system according to claim 33, whereas the plurality of machine executable instructions running on the server logs onto the source career website using a default username and a default password without further interaction by the job seeker and the plurality of computer instructions running on the server logs onto the source career website is preceded by a plurality of computer instructions running on the server that creates a default user account on the source career website using the default username and the default password without further interaction by the job seeker; and machine executable instructions running on the server to create a resume-ID wherein the resume-ID identifies a particular resume of the job seeker.

39. The computer system according to claim 38, wherein the default username and default password are specified by a job seeker.

40. The computer system according to claim 33, further comprising processing a resume of the job seeker to generate the job seeker profile; storing the job seeker profile in a job seeker profiles and resumes database.

41. The computer system according to claim 40, whereas the plurality of computer instructions running on the server that captures the job seeker profile includes a plurality of computer instructions running on the server that uploads a text resume from a client workstation without further interaction by the job seeker.

42. The computer system according to claim 41, whereas the plurality of computer instructions running on the server that captures the job seeker profile further includes a plurality of computer instructions running on the server that provides a user interface to a job seeker for entering information into the job seeker profile without further interaction by the job seeker.

* * * * *